(12) United States Patent
Morrisroe

(10) Patent No.: US 8,633,416 B2
(45) Date of Patent: Jan. 21, 2014

(54) PLASMAS AND METHODS OF USING THEM

(75) Inventor: Peter J. Morrisroe, New Milford, CT (US)

(73) Assignee: Perkinelmer Health Sciences, Inc., Waltham, MA (US)

(*) Notice: Subject to any disclaimer, the term of this patent is extended or adjusted under 35 U.S.C. 154(b) by 1839 days.

(21) Appl. No.: 11/372,996

(22) Filed: Mar. 10, 2006

(65) Prior Publication Data

US 2007/0075051 A1 Apr. 5, 2007

Related U.S. Application Data

(60) Provisional application No. 60/661,095, filed on Mar. 11, 2005.

(51) Int. Cl.
*B23K 9/00* (2006.01)
*B23K 9/02* (2006.01)
*G01N 21/73* (2006.01)
*B01D 59/44* (2006.01)

(52) U.S. Cl.
USPC ............ 219/121.52; 219/121.44; 219/121.48; 356/316; 250/288

(58) Field of Classification Search
USPC ............. 219/121.52, 121.41, 121.44, 121.59, 219/121.5, 121.48; 156/345.39; 438/301, 438/222; 118/723 I; 356/316; 250/288
See application file for complete search history.

(56) References Cited

U.S. PATENT DOCUMENTS

| | | | |
|---|---|---|---|
| 3,648,015 A | 3/1972 | Fairbairn | |
| 4,118,618 A | 10/1978 | Gauthier et al. | |
| 4,419,575 A | 12/1983 | Lakatos et al. | |
| 4,482,246 A | 11/1984 | Meyer et al. | |
| 4,540,884 A | 9/1985 | Stafford et al. | |
| 4,629,940 A | 12/1986 | Gagne et al. | |
| 4,766,287 A | 8/1988 | Morrisroe et al. | |
| 4,798,464 A | 1/1989 | Boostrom | |
| 4,818,916 A | 4/1989 | Morrisroe | |
| 5,024,725 A | 6/1991 | Chen | |
| 5,334,834 A * | 8/1994 | Ito et al. | 250/288 |
| 5,526,110 A | 6/1996 | Braymen | |
| 5,534,998 A | 7/1996 | Eastgate et al. | |

(Continued)

FOREIGN PATENT DOCUMENTS

| | | |
|---|---|---|
| JP | 9-223595 | 8/1997 |
| JP | 9-250986 | 9/1997 |
| JP | 2001126898 | 5/2001 |

OTHER PUBLICATIONS

Eden et al., "Microplasma devices fabricated in silicon, ceramic, and metal/polymer structures: arrays, emitters and photodetectors," *J. Phys. D: Appl. Phys.* 36: 2869-2877, Dec. 2003.

(Continued)

*Primary Examiner* — Quang Van
(74) *Attorney, Agent, or Firm* — Rhodes IP PLC; Christopher R Rhodes

(57) ABSTRACT

Plasma devices and methods for using such plasma devices in analytical measurements are disclosed. In certain examples, a low flow plasma may be operative using a total argon gas flow of less than about five liters per minute, and in some embodiments, a plasma argon gas flow of less than about four liter per minute. In other examples, a plasma produced using inductive and capacitive coupling is disclosed.

20 Claims, 19 Drawing Sheets

(56) References Cited

U.S. PATENT DOCUMENTS

| | | | |
|---|---|---|---|
| 5,648,701 | A | 7/1997 | Hooke et al. |
| 5,818,581 | A | 10/1998 | Kurosawa et al. |
| 5,865,896 | A | 2/1999 | Nowak et al. |
| 6,236,012 | B1 * | 5/2001 | Carre et al. ............... 219/121.52 |
| 6,329,757 | B1 | 12/2001 | Morrisroe et al. |
| 2004/0169855 | A1 | 9/2004 | Morrisroe |
| 2004/0173579 | A1 | 9/2004 | Carr |
| 2004/0219737 | A1 * | 11/2004 | Quon ............................ 438/222 |

OTHER PUBLICATIONS

Kikuchi et al., "Rf microplasma jet at atmospheric pressure: characterization and application to thin film processing," *J. Phys. D: Apply Phys.* 37: 1537-1543, Jun. 7, 2004.

Boswell et al, Helicons—The Early Years, IEEE Transactions on Plasma Science, 25: Dec. 4, 1997.

International Search Report and Written Opinion for PCT/US06/08687.

* cited by examiner

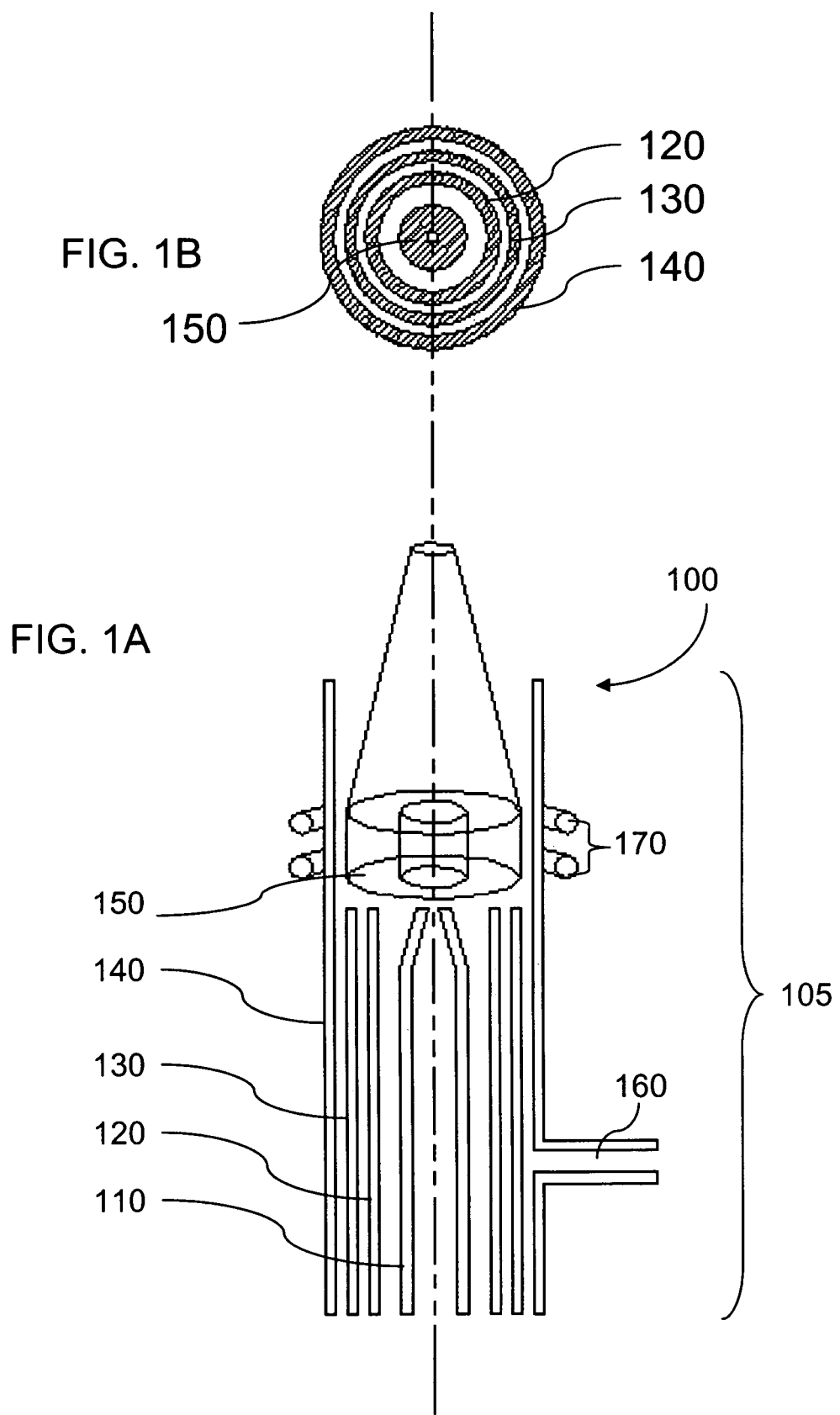

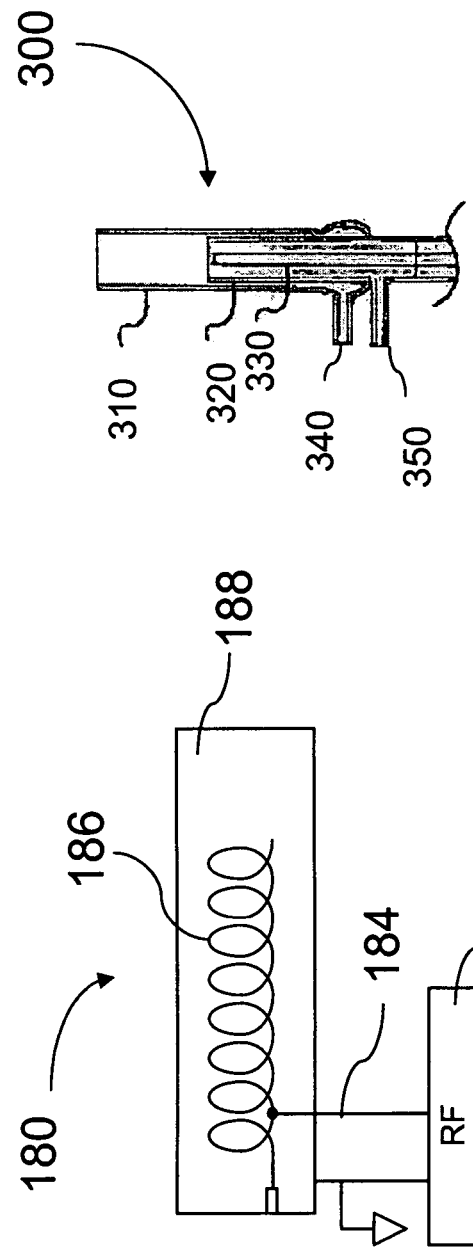

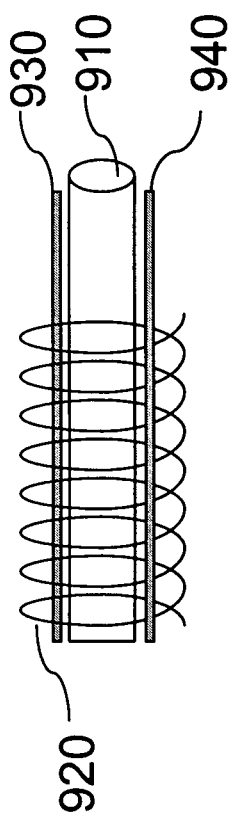
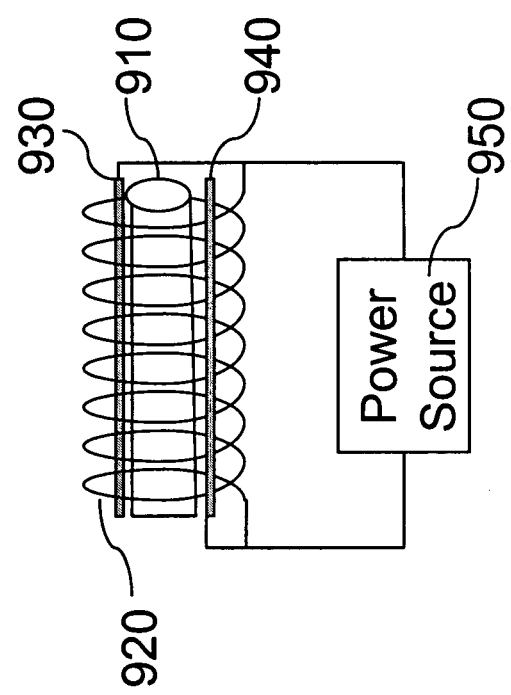

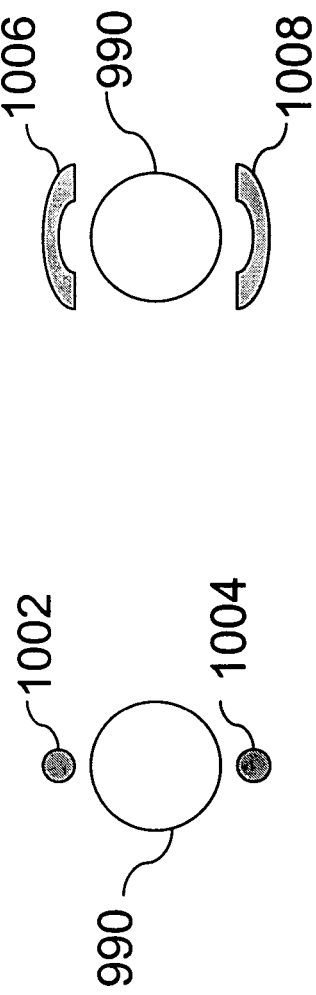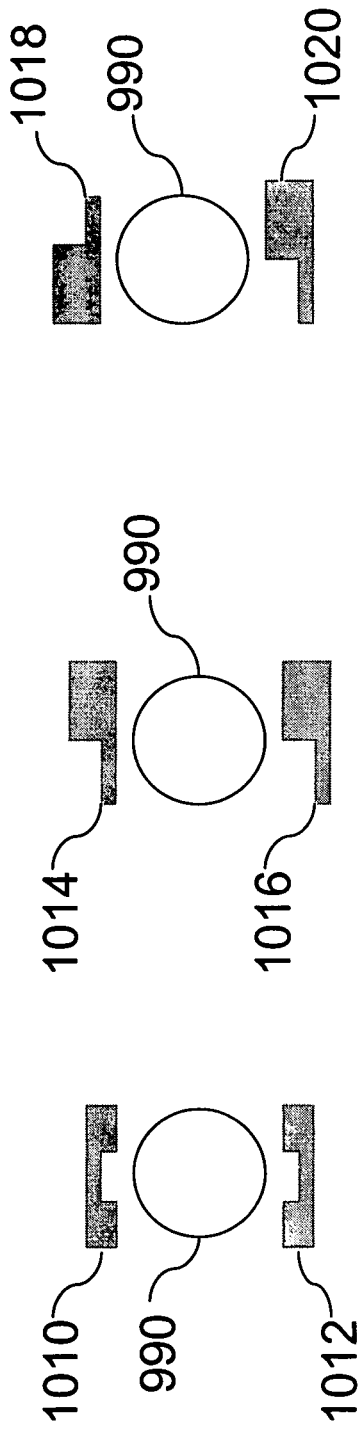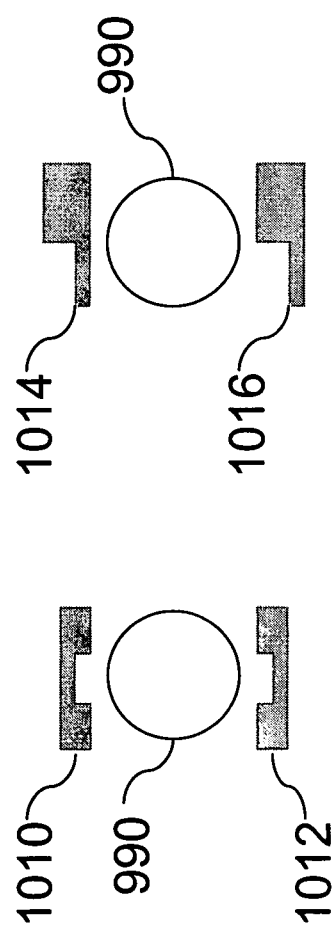

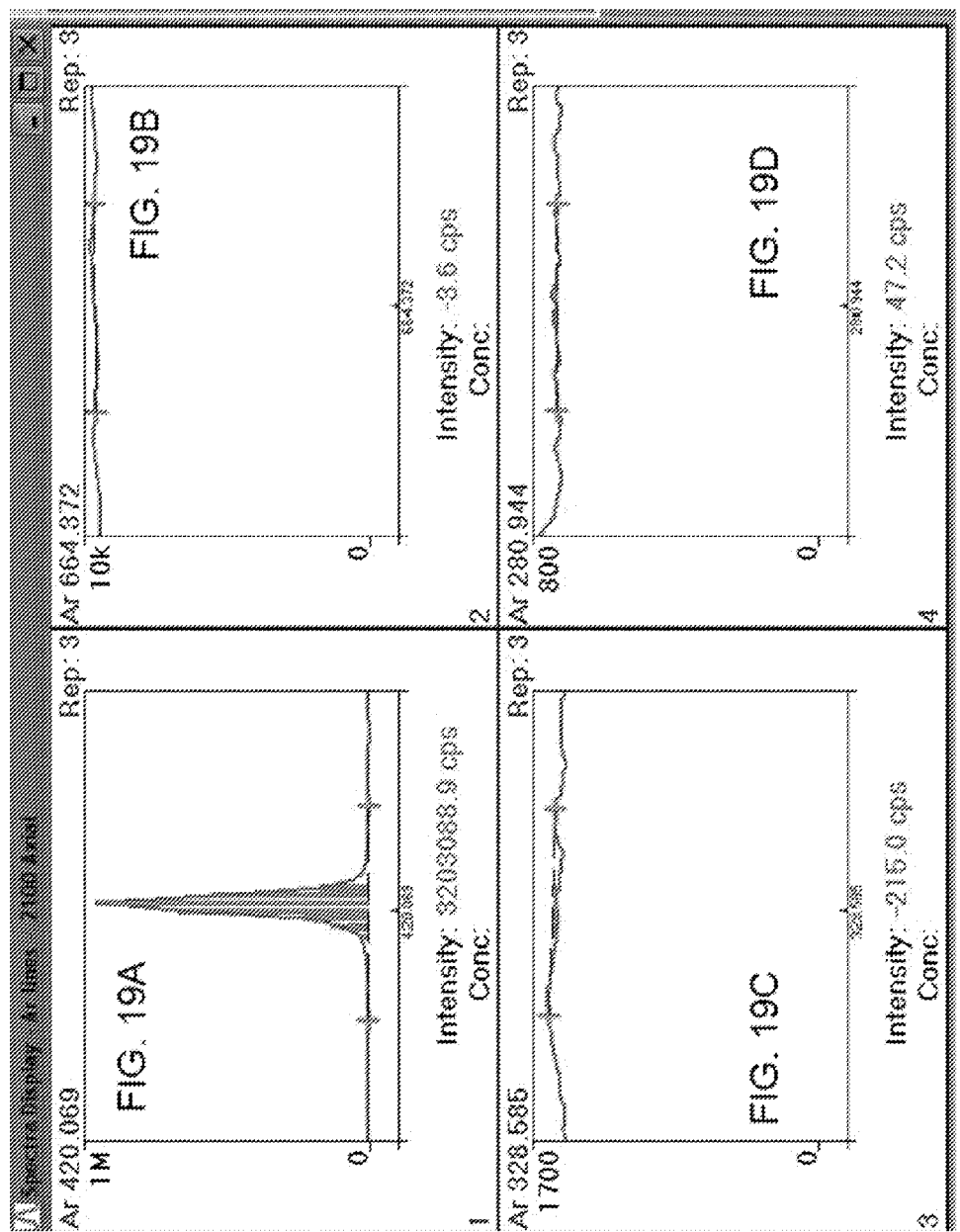

PLASMAS AND METHODS OF USING THEM

PRIORITY APPLICATION

This application claims priority to U.S. Provisional Application No. 60/661,095 filed on Mar. 11, 2005, the entire disclosure of which is hereby incorporated herein by reference for all purposes.

FIELD OF THE TECHNOLOGY

Certain examples disclosed herein relate to plasma devices and methods for using such plasma devices in chemical analysis.

BACKGROUND

A typical plasma requires a significant amount of argon to sustain the plasma and/or to cool glassware associated with a plasma. The costs for such amounts of argon may prohibit many companies and researchers from using analytical instruments having plasmas. In addition, the low availability of argon in third world countries has prevented widespread adoption of analytical instruments with plasmas in those countries.

SUMMARY

An argon plasma is disclosed. In certain examples, the plasma is operative or sustained at a total argon gas flow of less than about five liters per minute. In some examples, the plasma is operative at a plasma argon gas flow of less than about four liters per minute. In other examples, the plasma is operative at a barrier gas flow of about four to five liters per minute. In certain examples, the barrier gas is nitrogen.

In accordance with another aspect, a spectroscopic system is provided. In certain examples, the spectroscopic system includes a torch configured to sustain a low flow plasma or a plasma configured with a barrier gas. In other examples, the spectroscopic system may also include at least one inductive device surrounding at least some portion of the torch body. In some examples, the inductive device is configured to generate a loop current. In other examples, the inductive device comprises a flat plate electrode, as described herein. The spectroscopic system may also include a detector for analyzing characteristic features of excited atoms, such as, for example, optical emission, atomic absorption, mass spectroscopy and the like.

In accordance with another aspect, a torch for generating a plasma is provided. In certain examples, the torch includes a plasma gas port configured to receive argon gas for generating a plasma in the torch. The torch may also include an auxiliary gas port configured to receive argon gas for controlling the plasma discharge height above a torch injector. The torch may further include a barrier gas port adapted to receive a cooling gas to cool the torch. Additional features may also be present in the torch.

In accordance with an additional aspect, a device for optical emission spectroscopy is disclosed. In certain examples, the device may include a torch configured to sustain a low flow plasma, or to sustain a plasma configured with a barrier gas, an inductive device configured to generate a magnetic field in the torch, and a detection device configured to detect optical emission of species in the torch. In some examples, the detection device is configured to detect optical emission radially, axially or both. In certain examples, the detection device may include a photomultiplier tube, a monochromator, a lens, a grating, a charge coupled device (CCD) and the like. In some examples, a computer configured for data acquisition is in electrical communication with the detection device. Additional features may also be included, and illustrative additional features are described herein.

In accordance with another aspect, a device for absorption spectroscopy is provided. In certain examples, the device includes a torch configured to sustain a low flow plasma, or to sustain a plasma configured with a barrier gas, an inductive device configured to generate a magnetic field in the torch, a light source configured to provide light to the torch, and a detection device configured to measure light absorbance of species in the torch. In some examples, the light source is a visible, ultraviolet or infrared light source. The device may also include a sample introduction device in fluid communication with the low flow plasma. Illustrative light sources are described herein. In certain examples, the detection device may include a photomultiplier tube, a monochromator, a lens, a grating, a CCD and the like. In some examples, a computer configured for data acquisition is in electrical communication with the detection device. Additional features may also be included, and exemplary additional features are described herein.

In accordance with an additional aspect, a device for mass spectroscopy is disclosed. In certain examples, the device includes a torch configured to sustain a low flow plasma, or to sustain a plasma configured with a barrier gas, an inductive device configured to generate a magnetic field in the torch, and a mass analyzer in fluid communication with the torch and configured to separate species based on mass-to-charge ratios. In some examples, the analyzer is selected from one or more of a scanning mass analyzer, a magnetic sector analyzer, a quadrupole mass analyzer, an ion trap analyzer, or combinations thereof. In certain examples, the device for mass spectroscopy may also include a detection device in fluid communication with the mass analyzer. In some examples, the detection device is selected from one or more of an electron multiplier, a Faraday cup, or combinations thereof. In other examples, a processing device, such as a microprocessor, may be in electrical communication with the detection device. In some examples, the processing device may include, or have access to, a database.

In accordance with an additional aspect, a method of generating a plasma in a torch is disclosed. In certain examples, the method includes igniting a plasma in the presence of an argon gas flow. Examples of the method may also include introducing a non-argon barrier gas flow. Examples of the method may further include reducing the argon gas flow.

In accordance with an additional aspect, a method comprising providing inductive coupling and capacitive coupling to a plasma to increase the ionization potential of the plasma is provided. In certain embodiments, the method further comprises configuring the capacitive coupling to increase ionization potential of the plasma to at least about 25 eV. In other embodiments, the method further comprises configuring the torch with a first plate and a second plate to provide the capacitive coupling.

The plasmas and devices using them discussed herein represent a significant technological advance. At least some of the plasmas disclosed herein may be operated using reduced amounts of argon, as compared to existing plasma, without any substantial loss in performance, which can lead to reduced operating costs. Plasmas may also be operated with capacitive coupling to increase the ionization potential of the plasma.

BRIEF DESCRIPTION OF FIGURES

Certain examples are described below with reference to the accompanying figures in which:

FIG. 1A is a view of a torch and plasma and FIG. 1B is a cross-sectional, top view through the torch and plasma of FIG. 1A, in accordance with certain examples;

FIG. 2 is a schematic of a helical resonator that uses a helical load coil in electrical communication with an RF generator, in accordance with certain examples;

FIG. 3 is a schematic of a Fassel torch, in accordance with certain examples;

FIGS. 9A-9D are schematics of a device for providing a capacitively coupled plasma, in accordance with certain examples;

FIGS. 9E-9I are schematics of illustrative electrodes that may be used to provide capacitive coupling, in accordance with certain examples;

FIGS. 19A-19D are graphs showing ionization potentials using an inductively coupled plasma, in accordance with certain examples.

Figure 4:
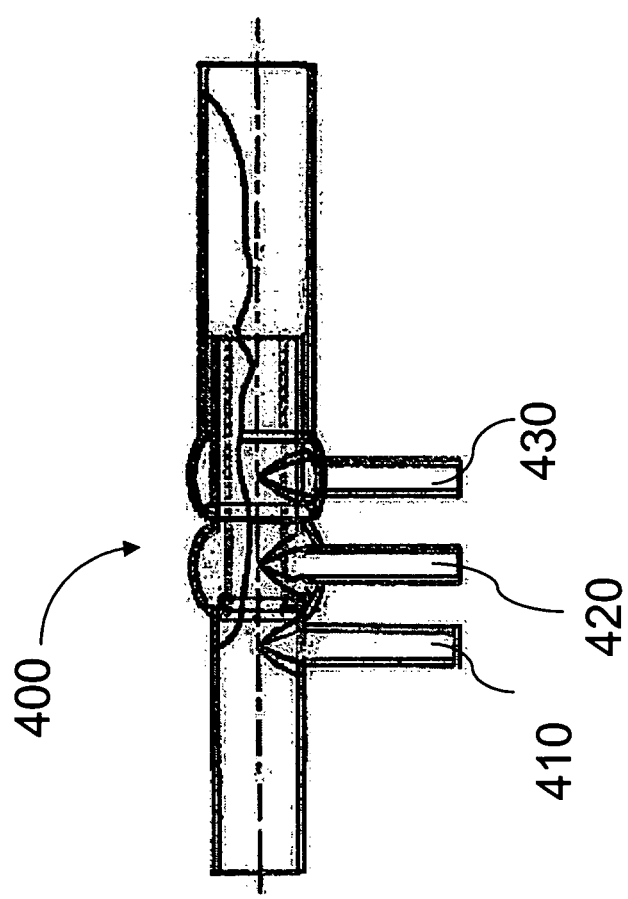
FIG. 4 is a schematic of a torch suitable for sustaining a low flow plasma, in accordance with certain examples.

It will be understood by the person of ordinary skill in the art, given the benefit of this disclosure, that certain features in the drawings may have been enlarged or distorted relative to other features to facilitate a more clear explanation and to provide an easier understanding of the illustrative features, aspects and examples discussed herein.

DETAILED DESCRIPTION

Certain features and aspects disclosed herein are directed to devices and methods of controlling the properties, e.g., volume, shape, and/or temperature regions, of an inductively coupled plasma and/or a plasma that is inductively coupled and capacitively coupled. In certain examples, the volume, shape, and/or temperature regions of the plasma are adjusted through the use of a non-argon barrier gas. In some examples, the components or devices used to control the volume, shape, and/or temperature regions of an inductively coupled plasma are a torch and a RF generator that are used to operate the plasma provided herein. In certain examples, the amount of argon required to sustain the plasma is at least about 50% less than the amount of argon used to operate a plasma that uses only argon gas flows. Plasmas using a total argon gas flow of less than about five liters per minute are referred to in some instances herein as "low flow" plasmas. In other examples, the plasma is both inductively coupled and capacitively coupled to provide a mutually coupled plasma with an increased plasma ionization potential, in at least certain regions, when compared to the plasma ionization potential using an inductively coupled plasma.

In accordance with certain examples, devices and methods for providing a low flow plasma are disclosed. Argon gas is very costly and is very difficult to obtain in remote areas of the world. Any reduction in instrument argon consumption may greatly reduce operating costs of plasma devices. Examples of certain methods and devices disclosed herein can reduce the argon consumption to less than one-half or one-quarter of the amount required to operate an existing plasma device (or instrument). Certain examples of such low flow plasmas can further improve instrument performance by one or more of the following ways: increasing the signal (sample emission), lowering the background emission, improving the plasma stability and/or allowing a larger volume of sample to be introduced into the plasma.

The earliest inductively coupled plasma (ICP) torch was credited to Stanley Greenfield of Birmingham, England in the early 1960's. The ICP torch was used in an atmospheric pressure inductively coupled plasma for elemental analysis. This torch was later refined by Velmer Fassel and his colleagues at Iowa State University. This torch design has remained relatively constant since the early 1970's. Existing versions of the Fassel torch require about 16 L/min. of argon plasma gas, less than about one L/min. of argon auxiliary gas and, depending on the sample introduction system, from about 0.5 L/min. to about one L/min. of argon nebulizer gas. This torch uses a large flow of argon gas as the plasma gas. When this gas flow is reduced the temperature of the quartz of the torch becomes excessive and the quartz begins to melt. This melting occurs because the gas which is being ionized and used to sustain the main RF discharge is also used to cool the glassware of the torch.

Certain examples disclosed herein separate the plasma gas and the cooling gas to provide a flow of argon to sustain a plasma discharge and provide a separate flow of a barrier gas between the plasma discharge and a quartz torch. As used herein, a "barrier gas" refers to a gas that is not directly ionized, has a reduced tendency to be directly ionized or does not sustain radio frequency (RF) current as compared to a plasma gas. Because a barrier gas does not carry the high RF currents carried by a plasma gas, a barrier gas may be used to constrict and shape the plasma. Since there is substantially no RF current in the barrier gas, the temperature of the barrier gas is less than the plasma gas, and the barrier gas may be used to cool the torch. In certain examples, the plasma gas may be reduced from about 16 L/min. to about 4 L/min., or less, for a 1500 watt discharge, or a lower flow of argon may be used for a lower power discharge. By using a separate barrier gas, an argon plasma discharge can be sustained at a low argon flow, such as 4-5 L/min., to isolate the hot plasma discharge gas from the quartz glassware. Without wishing to be bound by any particular scientific theory or this example, this method has the added and unexpected benefit of increasing the plasma gas temperature to desolvate the sample. This benefit is likely due to the constriction of the plasma volume by the barrier gas. As discussed herein, as the plasma power is sustained at a set value and the volume of the plasma gas is reduced, the resulting plasma temperature increases. This increase in temperature may allow for effective desolvation of a larger flow of sample than that which is achievable for a given power using existing torch and gas flow schemes.

In accordance with certain examples, a barrier gas used to cool a torch may be any suitable gas that has a reduced tendency to be directly ionized. In certain examples, the barrier gas is selected from inexpensive and generally inert gases such as nitrogen, ambient air, compressed air and the like. The flow rate of a barrier gas is selected to keep the torch glassware from melting and depends, at least in part, on the temperature of the plasma with a lower temperature plasma generally allowing a lower flow rate of barrier gas. In certain examples, the barrier gas flow rate is about 1-10 L/min., more particularly about 2-8 L/min., e.g., about 4-5 L/min. Additional suitable barrier gases and barrier gas flow rates will be readily selected by the person of ordinary skill in the art, given the benefit of this disclosure.

In accordance with certain examples, a low flow plasma is disclosed. In certain examples, a low flow plasma is sustained by introducing a cooling gas, e.g., a barrier gas. In some examples, as the amount of barrier gas introduced into the torch increases, the amount of argon introduced into the torch may decrease. For example, by switching a cooling gas to a gas other than argon, a very small, intense, and hot plasma discharge may be sustained. In certain examples, a low flow plasma is sustained using plasma generating components such as, for example, a Fassel torch and one or more inductive devices such as, for example, helical load coils. In other examples, a low flow plasma may be generated and/or sustained using, for example, a Fassel torch and plate electrodes, such as those described in commonly assigned U.S. patent application Ser. No. 10/730,779 entitled "ICP-OES and ICP-MS Induction Current" and filed on Dec. 9, 2003, commonly assigned U.S. patent application Ser. No. 11/156,249 entitled "Boost Devices and Methods of Using Them" and filed on Jun. 17, 2005, and commonly assigned U.S. patent application Ser. No. 11/218,912 entitled "Induction Device for Generating a Plasma" and filed on Sep. 2, 2005, the entire disclosure of each of which is hereby incorporated herein by reference. In yet other examples, a Fassel torch may be modified to include one or more additional gas inlets for introduction of a barrier gas, such as nitrogen, air or the like, and the modified torch may be used with helical load coils, plate electrodes or other suitable electrodes. It will be within the ability of the person of ordinary skill in the art, given the benefit of this disclosure, to select suitable components for generating low flow plasmas.

In certain examples, an inductively coupled argon plasma operative at a total argon flow of less than about five liters per minute is provided. The gas flow through a torch includes a plasma gas, a barrier gas, an auxiliary gas and a sample gas. Referring to FIG. 1A, an inductively coupled plasma device 100 includes a chamber 105 comprising three or more tubes, such as tubes 110, 120, 130, 140, a plasma 150, an inlet 160 and radio frequency induction coils 170. The tube 110 is in fluid communication with a gas source, such as argon, and a sample introduction device, such as a nebulizer. The argon gas aerosolizes the sample and carries it into the desolvation and ionization regions of the plasma 150. An auxiliary gas flow is supplied between tubes 110 and 120, which is used to shift the plasma above the inner tubes to keep them from melting. A plasma gas is supplied between tubes 120 and 130. A barrier gas passes between the outer tube 140 and the inner tube 130 to isolate the plasma 150 from the outer tube 140. Without wishing to be bound by any particular scientific theory or this example, a barrier gas may be introduced through inlet 160, and the barrier gas flow cools the inside wall of the outside tube 140 and centers the plasma 150 radially. The radio frequency inductions coils 170 are in electrical communication with a radio frequency generator (not shown) and are constructed and arranged to create the plasma 150 after the gas is ionized using an arc, spark, etc. FIG. 1B shows a cross-section through the inductively coupled plasma device 100. The person of ordinary skill in the art, given the benefit of this disclosure, will be able to select or design suitable plasmas including, but not limited to inductively coupled plasmas, inductively-capacitively coupled plasmas, direct current plasmas, microwave induced plasmas, etc., and suitable devices for generating plasmas are commercially available from numerous manufacturers including, but not limited to, PerkinElmer, Inc. (Wellesley, Mass.), Varian Instruments, Inc. (Palo Alto, Calif.), Teledyne Leeman Labs, (Hudson, N.H.), and Spectro Analytical Instruments (Kleve, Germany).

In accordance with certain examples, an illustrative device for providing radio frequency fields is shown in FIG. 2. A helical resonator 180 comprises a RF source 182, an electrical lead 184, which typically is a coaxial cable, configured to provide electrical communication with a coil 186 in a resonant cavity 188. The resonant cavity 188 with the coil 186 is configured to receive a chamber, such as the one shown in the torch of FIG. 1A. In certain examples, radio frequency fields from about 20 MHz to about 500 MHz can be generated using, for example, helical resonators. Exemplary dimensional information for construction of helical resonators will be readily selected by the person of ordinary skill in the art, given the benefit of this disclosure.

In accordance with certain examples, numerous types of torches may be used to generate the low flow plasma. Two illustrative torches are shown in FIGS. 3 and 4. Referring to FIG. 3, torch 300 includes an outer tube 310, an inner tube 320, and an injector 330. The torch 300 also includes a plasma gas inlet 340 and an auxiliary gas inlet 350. In one embodiment of operation of the FIG. 3 torch 300, the plasma gas flow rate is about 16-20 L/min. of argon gas, the auxiliary gas flow rate is about 0.5-1.0 L/min. of gas, and the nebulizer gas flow rate is about 0.5-1.0 L/min. of argon gas. The plasma is produced by generating a magnetic field in the torch and igniting the argon plasma gas in the magnetic field. In examples where a low flow plasma is produced in the torch of FIG. 3, after ignition of the plasma, the argon auxiliary gas flow rate may be increased, e.g., to about 16-20 L/min. The argon plasma gas flow rate may be reduced to about 4-5 L/min. before being switched, e.g., pneumatically switched, to a nitrogen barrier gas of about the same 4-5 L/min. flow rate. Once this result is achieved, the auxiliary gas flow can be reduced to a minimum level needed to maintain a stable discharge while not overheating the glassware. This method may sustain a plasma using an auxiliary gas flow that is often used to control the height of the plasma above the injector. A nebulizer gas flow rate of about 0.5 to about 1 L/min. is typically used to introduce sample into the torch. In certain embodiments, the plasma gas/barrier gas enter the port 340 and flow between the outer tube 310 and the intermediate tube 320. The auxiliary gas enters port 350 and flows between the inner tube 330 and the intermediate tube 320. The sample flows through the inner tube 330. The exact dimensions of the torch, ports, etc may vary, and illustrative dimensions are similar to those of a torch used in a PerkinElmer Optima 4300V torch assembly (Part No. N0771500) with the viewing slots removed.

Referring now to FIG. 4, another example of a torch 400 is shown. The torch 400 includes an auxiliary gas inlet 410, a plasma gas inlet 420 and a barrier gas inlet 430. In examples where a plasma is sustained in the torch 400 of FIG. 4, the barrier gas flow rate is typically set to zero L/min. during ignition of the plasma. The auxiliary gas flow rate may be set to about 0.1-0.5 L/min. of argon and the plasma gas may be set to about 12-20 L/min. of argon. After application of a suitable power to the electrodes and ignition of the plasma, the barrier gas flow rate may be increased from zero L/min. to around 3-7 L/min. of barrier gas. The argon plasma gas flow rate may be reduced to about 3-5 L/min. of argon gas. A nebulizer gas flow rate of about 0.5 to about 2 L/min. is typically used to introduce sample into the torch 400. In certain embodiments and referring to FIG. 1A and FIG. 4, the barrier gas enters port 430 and flows between the outer tube 140 and the intermediate tube 130. The plasma gas enters port 420 and flows between the intermediate tubes 120 and 130. The auxiliary gas enters port 410 and flows between the inner tube 110 and the intermediate tube 120. The sample flows through the inner tube 110. The exact dimension of the torch illustrated in FIG. 4 may vary and are typically the same dimensions, or similar dimensions, to the torch shown in FIG. 3 with an additional gas port and intermediate inner tube. This intermediate tube may be, for example, about 8-15 mm outer diameter, e.g., about 12 mm outer diameter, and have about 0.5-3 mm wall thickness, e.g., about 1 mm wall fused quartz tube.

In accordance with certain examples, either of the illustrative torches shown in FIGS. 3 and 4 may be used with helical load coils or with induction plate load coils, such as those described in commonly assigned U.S. patent application Ser. No. 10/730,779 entitled "ICP-OES and ICP-MS Induction Current" and filed on Dec. 9, 2003, commonly assigned U.S. patent application Ser. No. 11/156,249 entitled "Boost Devices and Methods of Using Them" and filed on Jun. 17, 2005, and commonly assigned U.S. patent application Ser. No. 11/218,912 entitled "Induction Device for Generating a Plasma" and filed on Sep. 2, 2005.

In certain examples, an argon gas flow of less than about 10 L/min., more particularly less than about 5 L/min., e.g., less than about 4, 3, 2 or 1 L/min. may be used as the plasma gas to sustain the plasma. It will be recognized by the person of ordinary skill in the art, given the benefit of this disclosure, that as the internal diameter of the torch decreases, the various gas flow rates may be reduced. The exact flow rate of the plasma gas depends, at least in part, on the desired temperature and shape of the plasma. In other examples, about 0.05 to about 1 L/min. of auxiliary gas may be used, more particularly about 0.1 to about 0.5 L/min. of argon is used as the auxiliary gas, e.g., about 0.2 to about 0.5 L/min. of argon is used as the auxiliary gas. In some examples, a nebulizer flow of about 0.1 L/min. to about 2 L/min. may be used. In certain configurations of the low flow plasma disclosed herein, the increased temperature of the plasma can allow introduction of increased amounts of sample into the plasma for desolvation. For example, at least about 25% more, e.g., about 30%, 40% or 50% more, sample can be introduced into the low flow plasma for desolvation as compared to the amount that can be introduced into a conventional plasma.

In accordance with certain examples, a low flow plasma may be sustained using the following illustrative flow rates for the following gases: about 1-5 L/min. of nitrogen as a barrier gas, about 1-4 L/min. of argon as a plasma gas, about 0.1 to about 0.2 L/min. of argon as an auxiliary gas, and a nebulizer flow of about 0.1 L/min. to about 0.9 L/min. of argon. In certain examples, about 5 L/min. of nitrogen is used as a barrier gas. In other examples, about 4 L/min. of argon as a plasma gas is used. In yet other examples, about 0.2 L/min. of argon as an auxiliary gas is used. In additional examples, about 0.9 L/min. of argon gas is used in the nebulizer flow. Additional suitable flow rates of plasma gases, barrier gases and nebulizer gases will be readily selected by the person of ordinary skill in the art, given the benefit of this disclosure.

In accordance with certain examples, a spectroscopic system comprising a low flow plasma, or a plasma configured with a barrier gas, is provided. The exact configuration of the spectroscopic system depends, at least in part, on the desired or selected analytical method. Regardless of the analytical method, the spectroscopic system may include a torch configured to sustain a low flow plasma, or a plasma configured with a barrier gas, e.g., to shape the plasma, and at least one inductive device surrounding at least some portion of the torch and configured to generate a magnetic field in the torch. The system may further include a detector, which is typically selected based on the desired analytical method.

Figure 5:
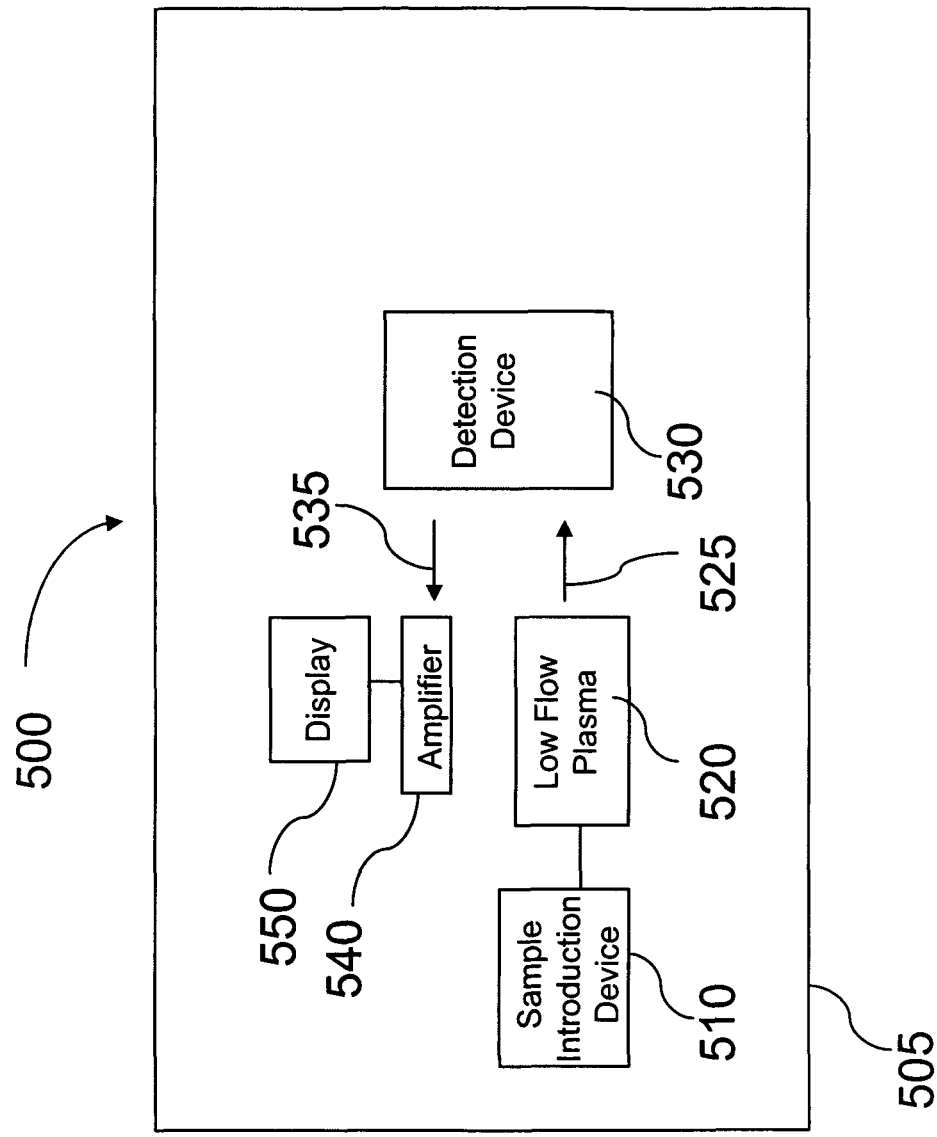
FIG. 5 is a schematic of an illustrative optical emission spectrometer, in accordance with certain examples.

Referring to FIG. 5, an exemplary optical emission spectrometer (OES) is shown. OES device 500 includes a housing 505, a sample introduction device 510, a low flow plasma 520, and a detection device 530. An optical emission 525 may be introduced into the detection device 530 and the selected light 535 may pass to an optional amplifier 540, which is in electrical communication with a display 550. The sample introduction device 510 can vary depending on the nature of the sample. In certain examples, the sample introduction device 510 is a nebulizer that is configured to aerosolize liquid sample for introduction into the low flow plasma 520. In other examples, the sample introduction device 510 is an injector configured to receive aerosol sample that can be directly injected or introduced into the plasma. Other suitable devices and methods for introducing samples will be readily selected by the person of ordinary skill in the art, given the benefit of this disclosure. The detection device 530 can take numerous forms and may be any suitable device that can detect optical emissions, such as optical emission 525. For example, the detection device 530 may include suitable optics, such as a lens, a mirror, a prism, a window, a band-pass filter, etc. The detection device 530 may also include a grating, such as an echelle grating, to provide a multi-channel OES device. Gratings such as echelle gratings allow for simultaneous detection of multiple emission wavelengths. The gratings can be positioned within a monochromator or other suitable device for selection of one or more particular wavelengths to monitor. In other examples, the OES device may be configured to implement Fourier transforms to provide simultaneous detection of multiple emission wavelengths. The detection device can be configured to monitor emission wavelengths over a large wavelength range including, but not limited to, ultraviolet, visible, near and far infrared, etc. The detection device may include a solid-state detector, such as a CCD. The OES device 500 may further include suitable electronics such as a microprocessor and/or computer and suitable circuitry to provide a desired signal and/or for data acquisition. Suitable additional devices and circuitry are known in the art and may be found, for example, in commercially available OES devices such as Optima 2100 DV series and Optima 5000 DV series OES devices, which are commercially available from PerkinElmer, Inc. The optional amplifier 540 is operative to increase the signal, e.g., amplify the signal from detected photons, and may provide the signal to the display 550, which may be a printer, readout, computer, etc. In certain examples, the amplifier 540 is a photomultiplier tube configured to receive signals from the detection device 530. Other suitable devices for amplifying signals, however, will be selected by the person of ordinary skill in the art, given the benefit of this disclosure. In examples where the signal is large enough to be detected using the circuitry and devices in the detection device 530, the amplifier 540 may be omitted. It will also be within the ability of the person of ordinary skill in the art, given the benefit of this disclosure, to retrofit existing OES devices to generate low flow plasmas and to design new OES devices using the low flow plasmas disclosed herein. The OES devices may further include autosamplers, such as AS90 and AS93 autosamplers commercially available from PerkinElmer, Inc. or similar devices available from other suppliers.

Figure 6:
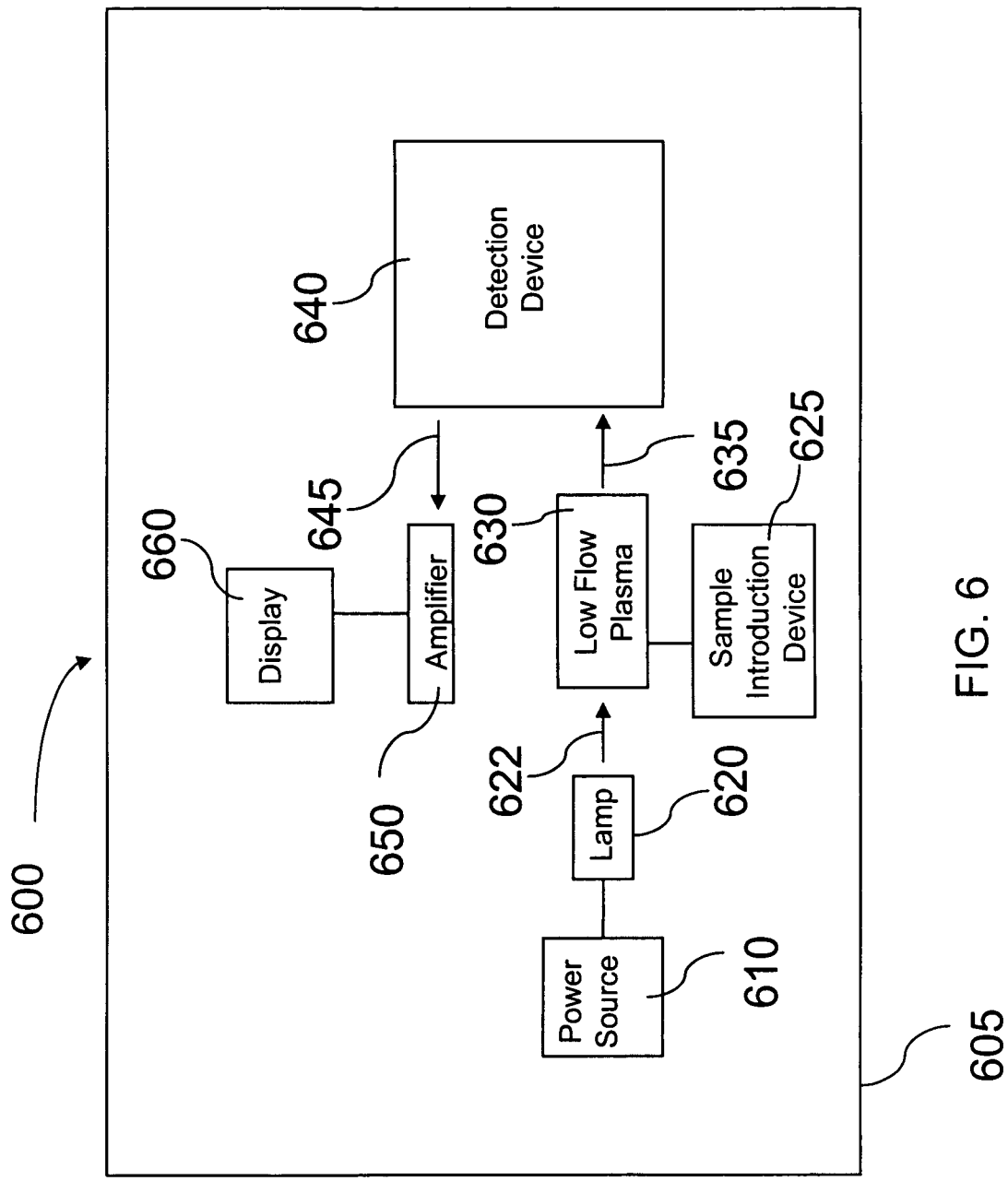
FIG. 6 is a schematic of an exemplary single beam atomic absorption spectrometer, in accordance with certain examples.

In accordance with certain examples, a single beam device for absorption spectroscopy (AS) is shown in FIG. 6. Without wishing to be bound by any particular scientific theory or this example, atoms and ions can absorb certain wavelengths of light to provide energy for a transition from a lower energy level to a higher energy level. An atom or ion may contain multiple resonance lines resulting from transition from, for example, a ground state to higher energy levels. The energy needed to promote such transitions can be supplied using numerous sources, e.g., heat, flames, plasmas, arc, sparks, cathode ray lamps, lasers, etc, as discussed herein. Suitable sources for providing such transition energy and suitable wavelengths of light for providing such transition energy will be readily selected by the person of ordinary skill in the art, given the benefit of this disclosure.

In accordance with certain examples and referring to FIG. 6, an illustrative single beam AS device 600 includes a housing 605, a power source 610, a lamp 620 connected to the power source 610, a sample introduction device 625 in fluid communication with a low flow plasma 630, a detection device 640 configured to receive a signal from the low flow plasma 630, an optional amplifier 650 configured to receive a signal from the detection device 640, and a display 660 in electrical communication with the amplifier 650. The power source 610 may be configured to supply power to the lamp 620, which provides one or more wavelengths of light 622 for absorption by atoms and ions. Suitable lamps include, but are not limited to electrode-less discharge lamps, hollow cathode lamps, mercury lamps, cathode ray lamps, lasers, etc., or combinations thereof. The lamp 620 may be pulsed using suitable choppers or pulsed power supplies, or in examples where a laser is implemented, the laser can be pulsed with a selected frequency, e.g., 5, 10, or 20 times per second. The exact configuration of the lamp 620 can vary. For example, the lamp 620 can provide light axially along the plasma 630, e.g., along the long-axis of the torch, or can provide light radially along the plasma 630, e.g., perpendicular to the long-axis of the torch. The example shown in FIG. 6 is configured to provide light axially from the lamp 620. There can be signal-to-noise advantages using axial viewing of signals. As sample is atomized and/or ionized in the low flow plasma 630, the incident light 622 from the lamp 620 excites atoms. That is, some percentage of the light 622 that is supplied by the lamp 620 is absorbed by the atoms and ions in the plasma 630. The remaining percentage of light 635 is transmitted to the detection device 640. The detection device 640 can select one or more suitable wavelengths using, for example, a prism, a lens, a grating and other suitable devices such as those discussed above in reference to the OES devices, for example. In some examples, the detection device 640 may include a solid-state detector, such as a CCD. The signal may be provided to the optional amplifier 650 for increasing the signal for transmission to the display 660. In examples where the signal is large enough to be detected using the circuitry and devices in the detection device 640, the amplifier 650 may be omitted. To account for the amount of absorption by sample in the low flow plasma 630, a blank, such as water, can be introduced prior to sample introduction to provide a 100% transmittance reference value. The amount of light transmitted once sample is introduced into the low flow plasma may be measured, and the amount of light transmitted with sample can be divided by the reference value to obtain a transmittance. The negative $\log_{10}$ of the transmittance is equal to the absorbance. The AS device 600 may further include suitable electronics such as a microprocessor and/or computer and suitable circuitry to provide a desired signal and/or for data acquisition. Suitable additional devices and circuitry can be found, for example, on commercially available AS devices such as, for example, AAnalyst series spectrometers commercially available from PerkinElmer, Inc. It will also be within the ability of the person of ordinary skill in the art, given the benefit of this disclosure, to retrofit existing AS devices to generate low flow plasmas and to design new AS devices using the low flow plasmas disclosed herein. The AS devices may further include autosamplers known in the art, such as AS-90A, AS-90plus and AS-93plus autosamplers commercially available from PerkinElmer, Inc.

Figure 7:
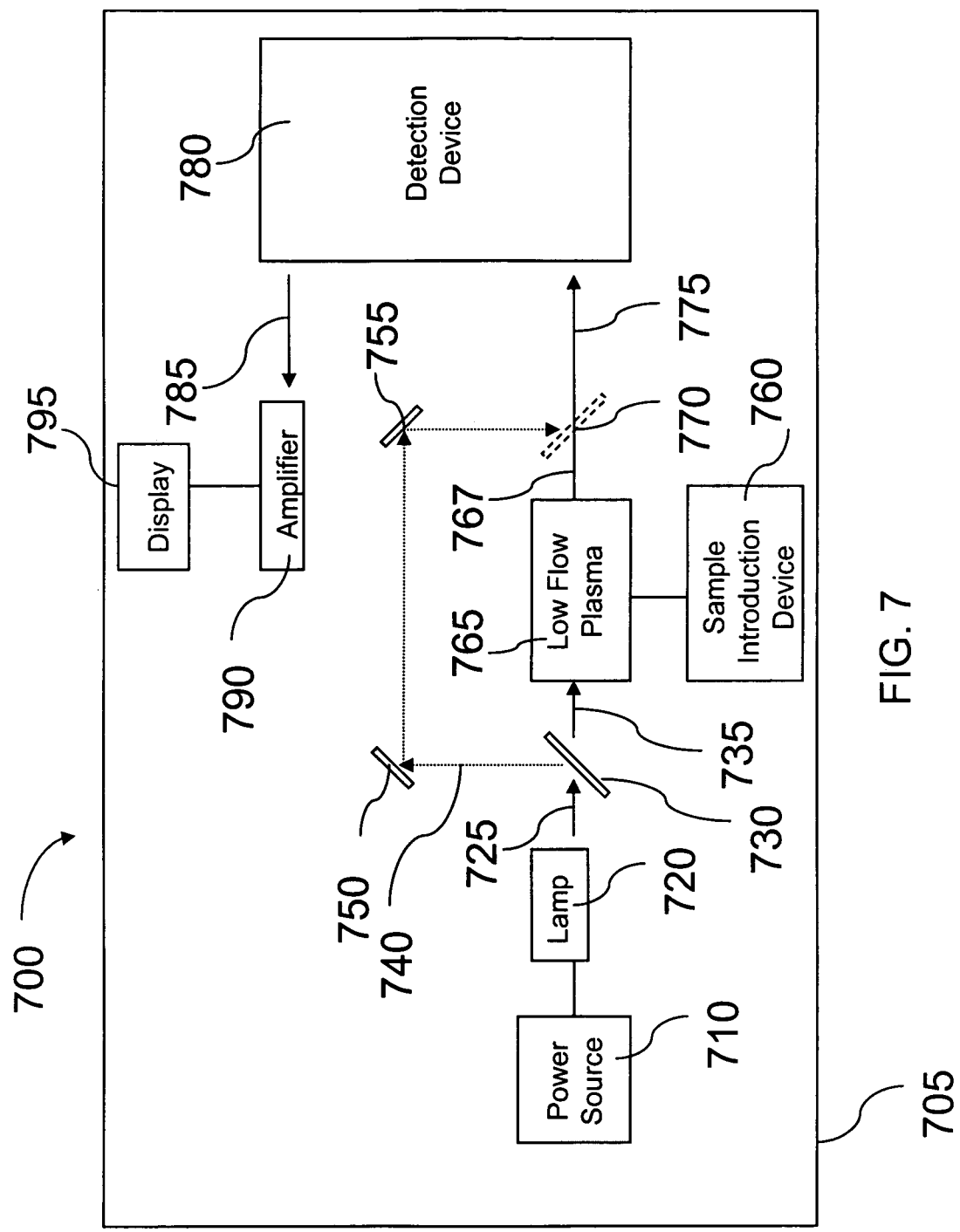
FIG. 7 is a schematic of an exemplary double beam atomic absorption spectrometer, in accordance with certain examples.

In accordance with certain examples and referring to FIG. 7, an illustrative dual beam AS device 700 includes a housing 705, a power source 710 in electrical communication with a lamp 720, a low flow plasma 765, a sample introduction device 760 in fluid communication with the low flow plasma 765, a detection device 780 configured to receive a signal from the low flow plasma 765, an optional amplifier 790 configured to receive a signal from the detection device 780 and an output device 795 configured to receive a signal from the amplifier 790. In examples where the signal is large enough to be detected using the circuitry and devices in the detection device 780, the amplifier 790 may be omitted. The power source 710 may be configured to supply power to the lamp 720, which provides one or more wavelengths of light 725 for absorption by atoms and ions. Suitable lamps include, but are not limited to, electrode-less discharge lamps, hollow cathode lamps, mercury lamps, cathode ray lamps, lasers, etc., or combinations thereof. The lamp may be pulsed using suitable choppers or pulsed power supplies, or in examples where a laser is implemented, the laser can be pulsed with a selected frequency, e.g. 5, 10 or 20 times per second. The configuration of the lamp 720 can vary. For example, lamp 720 can provide light axially along the low flow plasma 765 or can provide light radially along the low flow plasma 765. The example shown in FIG. 7 is configured for axial supply of light from the lamp 720. There can be signal-to-noise advantages using axial viewing of signals. As sample is atomized and/or ionized in the low flow plasma 765, the incident light 725 from the lamp 720 excites atoms. That is, some percentage of the light 735 that is provided by the lamp 720 is absorbed by the atoms and ions in the low flow plasma 765. At least a substantial portion of the remaining percentage of light 767 is transmitted to the detection device 780. In examples using dual beams, the incident light 725 can be split using a beam splitter 730 such that 50% of the light is transmitted as a beam 735 to the low flow plasma 765 and 50% of the light is transmitted as a beam 740 to lenses 750 and 755. The light beams can be recombined using a combiner 770, such as a half-silvered mirror, and a combined signal 775 may be transmitted to the detection device 780. The ratio between a reference value and the value for the sample can then be determined to calculate the absorbance of the sample. The detection device 780 can select one or more suitable wavelengths using, for example, prisms, lenses, gratings and other suitable devices known in the art, such as those discussed above in reference to the OES devices, for example. In some examples, the detection device 780 may include a solid-state detector, such as a CCD. Signal 785 can be provided to the amplifier 790 for increasing the signal for output to the display 795. The AS device 700 may further include suitable electronics known in the art, such as a microprocessor and/or computer, and suitable circuitry to provide a desired signal and/or for data acquisition. Suitable additional devices and circuitry can be found, for example, on commercially available AS devices such as, for example, AAnalyst series spectrometers commercially available from PerkinElmer, Inc. It will be within the ability of the person of ordinary skill in the art, given the benefit of this disclosure, to retrofit existing dual beam AS devices to generate low flow plasmas and to design new dual beam AS devices using the low flow plasmas disclosed here. The AS devices may further include autosamplers known in the art, such as AS-90A, AS-90plus and AS-93plus autosamplers commercially available from PerkinElmer, Inc.

Figure 8:
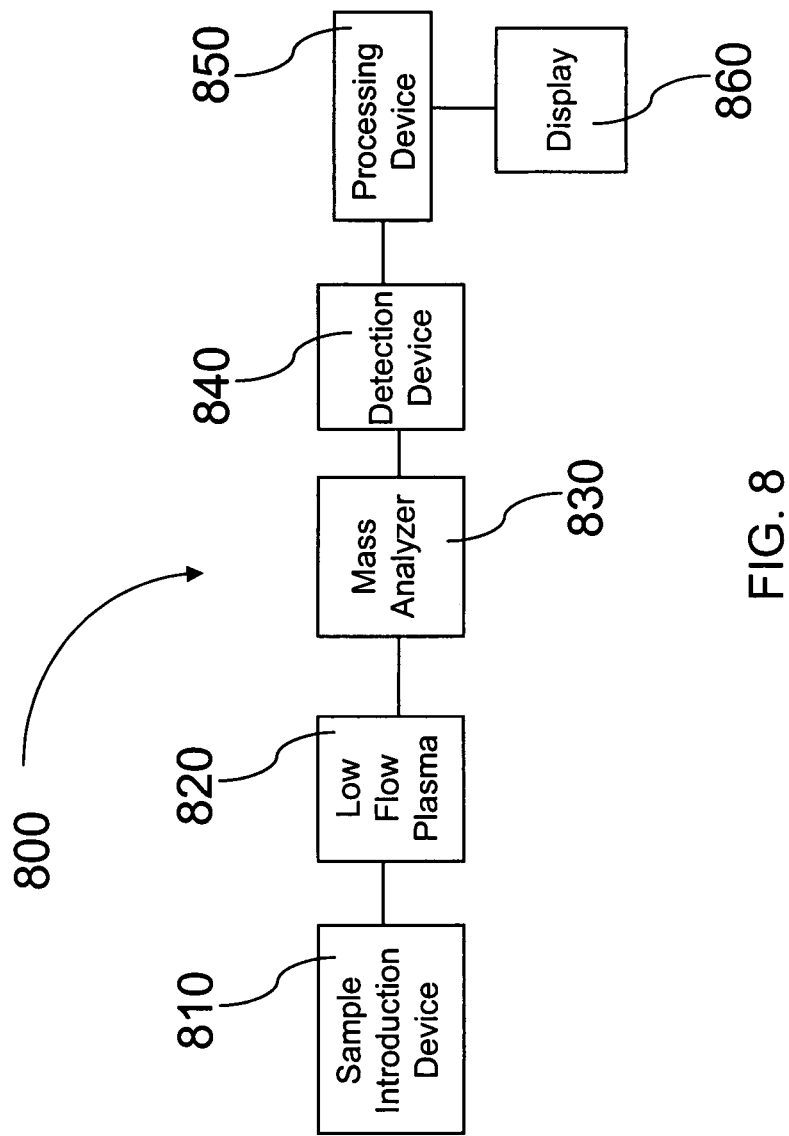
FIG. 8 is a schematic of an illustrative mass spectrometer, in accordance with certain examples.

In accordance with certain examples, an illustrative device for mass spectroscopy (MS) is schematically shown in FIG. 8. An MS device 800 includes a sample introduction device 810 in fluid communication with a low flow plasma 820, a mass analyzer 830, a detection device 840, a processing device 850 and a display 860. The sample introduction device 810, the low flow plasma 820, the mass analyzer 830 and the detection device 840 may be operated at reduced pressures using one or more vacuum pumps. In certain examples, however, only one or more of the mass analyzer 830 and/or the detection device 840 are operated at reduced pressures. The sample introduction device 820 may include an inlet system configured to provide sample to the low flow plasma 820. The inlet system may include one or more batch inlets, direct probe inlets and/or chromatographic inlets. The sample introduction device 810 may be an injector, a nebulizer or other suitable devices that can deliver solid, liquid or gaseous samples to the low flow plasma 820. The mass analyzer 830 can take numerous forms depending generally on the sample nature, desired resolution, etc. and exemplary mass analyzers are discussed further below. The detection device 840 can be any suitable detection device that can be used with existing mass spectrometers, e.g., electron multipliers, Faraday cups, coated photographic plates, scintillation detectors, etc. and other suitable devices that will be selected by the person of ordinary skill in the art, given the benefit of this disclosure. The processing device 850 typically includes a microprocessor and/or computer and suitable software for analysis of samples introduced into the MS device 800. One or more databases can be accessed by the processing device 850 for determination of the chemical identity of species introduced into the MS device 800. Other suitable additional devices known in the art can also be used with the MS device 800 including, but not limited to, autosamplers, such as AS-90plus and AS-93plus autosamplers commercially available from PerkinElmer, Inc.

In accordance with certain examples, the mass analyzer of MS device 800 can take numerous forms depending on the desired resolution and the nature of the introduced sample. In certain examples, the mass analyzer is a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that can separate species with different mass-to-charge ratios. The low flow plasmas disclosed herein can be used with any one or more of the mass analyzers listed above and other suitable mass analyzers.

In accordance with certain other examples, the low flow plasmas disclosed here may be used with existing ionization methods used in mass spectroscopy. For example, an electron impact source with a low flow plasma can be assembled to increase ionization efficiency prior to entry of ions into the mass analyzer. In other examples, a chemical ionization source with a low flow plasma may be assembled to increase ionization efficiency prior to entry of ions into the mass analyzer. In yet other examples, a field ionization source with a low flow plasma may be assembled to increase ionization efficiency prior to entry of ions into the mass analyzer. In still other examples, a low flow plasma may be used with desorption sources such as, for example, those sources configured for fast atom bombardment, field desorption, laser desorption, plasma desorption, thermal desorption, electrohydrodynamic ionization/desorption, etc. In yet other examples, a low flow plasma may be configured for use with thermospray or electrospray ionization sources. It will be within the ability of the person of ordinary skill in the art, given the benefit of this disclosure, to design suitable devices for ionization including a low flow plasma for use in mass spectroscopy.

In accordance with certain other examples, the OES, AS and MS devices disclosed here can be hyphenated with one or more other analytical techniques. For example, OES, AS or MS devices can be hyphenated with devices for performing liquid chromatography, gas chromatography, capillary electrophoresis, and other suitable separation techniques. When coupling an MS device that includes a low flow plasma with a gas chromatograph, it may be desirable to include a suitable interface, e.g., traps, jet separators, etc., to introduce sample into the MS device from the gas chromatograph. When coupling an MS device to a liquid chromatograph, it may also be desirable to include a suitable interface to account for the differences in volume used in liquid chromatography and mass spectroscopy. For example, split interfaces can be used so that only a small amount of sample exiting the liquid chromatograph is introduced into the MS device. Sample exiting from the liquid chromatograph may also be deposited in suitable wires, cups or chambers for transport to the low flow plasma of the MS device. In certain examples, the liquid chromatograph includes a thermospray configured to vaporize and aerosolize sample as it passes through a heated capillary tube. In some examples, the thermospray may include its own low flow plasma to increase ionization of species using the thermospray. Other suitable devices for introducing liquid samples from a liquid chromatograph into a MS device, or other detection device, will be readily selected by the person of ordinary skill in the art, given the benefit of this disclosure.

In certain examples, an MS device that includes a low flow plasma is hyphenated with at least one other MS device, which may or may not include a low flow plasma, for tandem mass spectroscopy analyses. For example, one MS device can include a first type of mass analyzer and the second MS device can include a different or similar mass analyzer as the first MS device. In other examples, the first MS device may be operative to isolate the molecular ions and the second MS device may be operative to fragment/detect the isolated molecular ions. It will be within the ability of the person of ordinary skill in the art, to design hyphenated MS/MS devices at least one of which includes a low flow plasma.

In accordance with certain examples a method of generating a low flow plasma is disclosed. In certain examples, the method includes igniting a plasma using an argon gas flow and introducing non-argon barrier gas flow. In some examples, as the non-argon barrier gas flow is introduced, the amount of argon gas flow is reduced by about 50% or more. The plasma is typically ignited using an arc, spark or the like. Subsequent to ignition of the plasma, one-half or more of the argon gas flow may be replaced with a non-argon gas, such as nitrogen, air or the like. In certain examples, about 75% or more of the argon gas is replaced with a non-argon barrier gas. In an exemplary method, an argon plasma gas flow of about 5-16 L/min. may be used during ignition of the plasma. Once the plasma has been ignited, a barrier gas flow may be introduced at a flow rate of about 4-5 L/min., and the argon plasma gas flow rate may be reduced to about 4-5 L/min. Using these illustrative flow rates, a low flow plasma may be sustained and used for desolvation, atomization, ionization or the like.

Additional devices that use a low flow plasma may also be assembled. For example, welding torches, soldering devices, brazing devices, cutting devices, vapor deposition devices, sputtering devices, or other suitable devices that may include a plasma may be constructed using the low flow plasmas disclosed herein.

In accordance with certain examples, a device to generate a plasma through the simultaneous coupling of both inductive and capacitive coupled RF energies is provided. In certain instances, the plasma produced and/or sustained using both inductive coupling and capacitive coupling is referred to herein as a mutually coupled plasma. In some instances the combination of an inductive device and a capacitive device is referred to as a "mutual coupling device." Plasmas that are produced using both inductive and capacitive coupling may be low flow plasma or may be plasmas that use conventional flow rates such as, for example, plasmas produced on commercially available instruments such as the Optima 2100 DV instruments or the Optima 5×00 series instruments available from PerkinElmer, Inc (Wellesley, Mass.). Plasmas generated through the use of a mutual coupling device may be used in instruments configured for optical emission, atomic absorption, mass spectroscopy or other detectors and instruments commonly used with plasmas. In certain embodiments, a capacitive device may be placed inside an inductive device to provide a mutual coupling device. For example and referring to FIG. 9A, a device includes a torch body 910, a load coil 920 surrounding the torch body, a first plate 930 between the load coil 920 and the torch body 910, and a second plate 940 between the load coil 920 and the torch body 910. The first plate 930 and the second plate 940 function as a capacitive device when the plates are charged. In certain examples, the first plate 930 and the second plate 940 are positioned substantially parallel to each other. Use of the capacitive coupling in combination with the inductive coupling may provide for higher ionization and excitation energies than are present when using only inductive coupling. For example, using capacitive coupling, plasmas having ionization potential of about 25 eV, 40 eV, 60 eV or larger may be produced. This result may allow for increased ionization efficiency, improved detection limits, and improved ionization of hard-to-ionize elements such as, for example, chlorine, arsenic, selenium, thallium and lead. It will be within the ability of the person of ordinary skill in the art, given the benefit of this disclosure, to design suitable devices for generating a plasma that are constructed and arranged to provide inductive coupling and capacitive coupling.

In certain examples, the first plate 930 and the second plate 940 may be connected to the same power source as the load coil 920. For example and referring to FIG. 9B, the load coil 920 or the first plate 930 and the second plate 940 may be connected to the same power source 950. In embodiments where a single power source is used to provide power to the load coil 920, the first plate 930 and the second plate 940, the inductive coupling and the capacitive coupling may be directly connected as shown, so that the voltage on the capacitive plates will be the same as the voltage on the load coil. It will be within the ability of the person of ordinary skill in the art, given the benefit of this disclosure, to connect impedance matching elements from each of the legs of the load coil to each of the capacitive plates to allow the voltage of the load coil and the capacitive plates to be independently tuned. In this manner the voltage on the capacitive plates could be greatly increased above the voltage of the load coil (or could be reduced below the voltage of the load coil) even though the capacitive plates are being driven from the load coil power. In other embodiments, two separate power sources may be used. For example and referring to FIG. 9C, a first power source 960 provides power to the load coil 920, and a second power source 970 provides power to the first plate 930 and the second plate 940. In embodiments where different power sources are used, the inductive coupling and the capacitive coupling may be individually controlled or tuned by altering either the power levels, or operating frequencies for example.

Figure 9D:
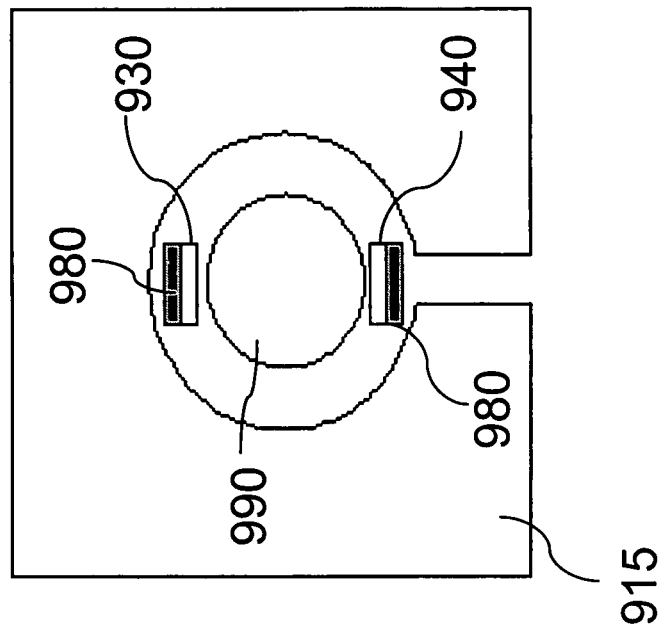
Figure 9C:
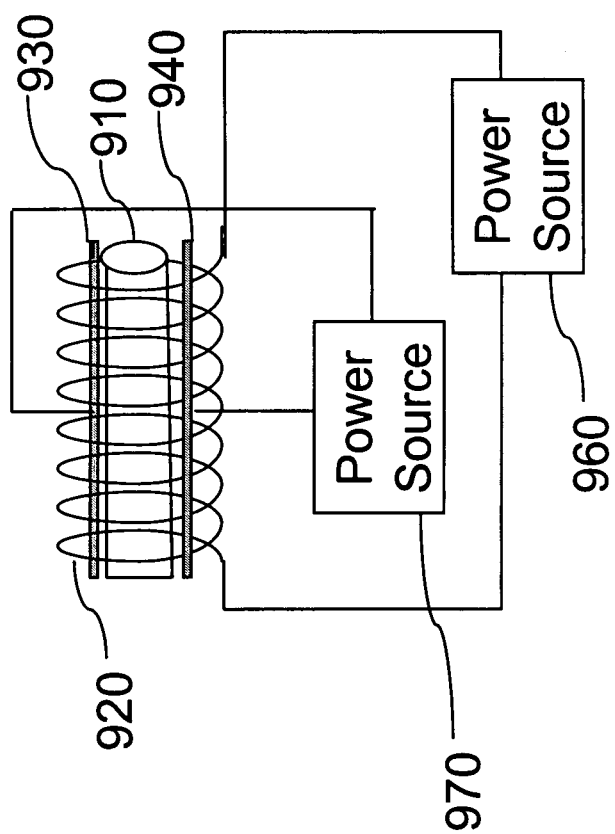

Though the devices shown in FIGS. 9A-9C are described with reference to a load coil, it will be recognized by the person of ordinary skill in the art, given the benefit of this disclosure, that the load coil may be replaced with plate electrodes or other suitable devices that can provide an inductively coupled plasma. In embodiments where a plate electrode is used, it may be desirable to include an insulator between the capacitive plate and the plate electrode to reduce or prevent unwanted arcing between the capacitive plate and the plate electrode. For example and referring to FIG. 9D, an axial view of an embodiment comprising a plate electrode 915, a first plate 930, a second plate 940, an insulator 980 and a torch body 990. The insulator 980 is positioned between the first plate 930 and the plate electrode 915 and between the second plate 940 and the plate electrode 915 to prevent or reduce unwanted arcing.

Devices other than flat plates may be used to provide the capacitive coupling. For example, the shape of the electrodes used to provide the capacitive coupling may take any form provided that some capacitive coupling is provided when the electrodes are charged. For example and referring to FIGS. 9E-9I, the electrode surrounding the torch body 990 may be cylindrical (1002, 1004), may be curved (1006, 1008) or may vary in thickness (1010, 1012). The electrodes may be symmetrical (1014, 1016) when viewed from a selected angle or may be asymmetrical (1018, 1020) when viewed from a selected angle. Additional configurations for electrodes used to provide capacitive coupling will be readily selected by the person of ordinary skill in the art, given the benefit of this disclosure.

Figure 10A:
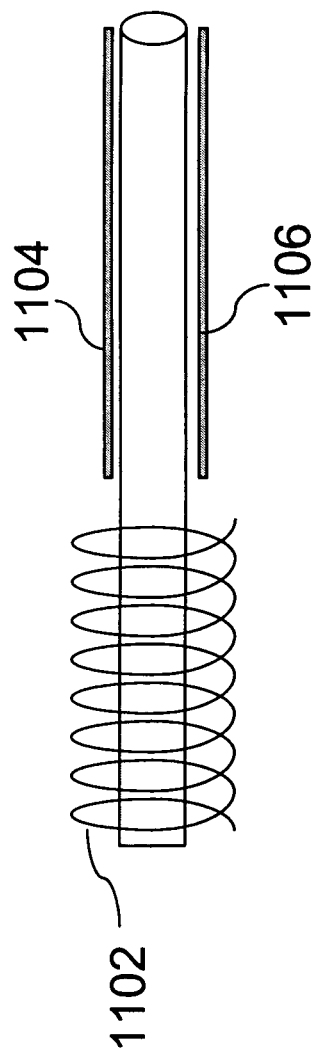
FIGS. 10A and 10B are schematics of embodiments that may be used to provide a capacitively coupled plasma, in accordance with certain examples.
Figure 10B:
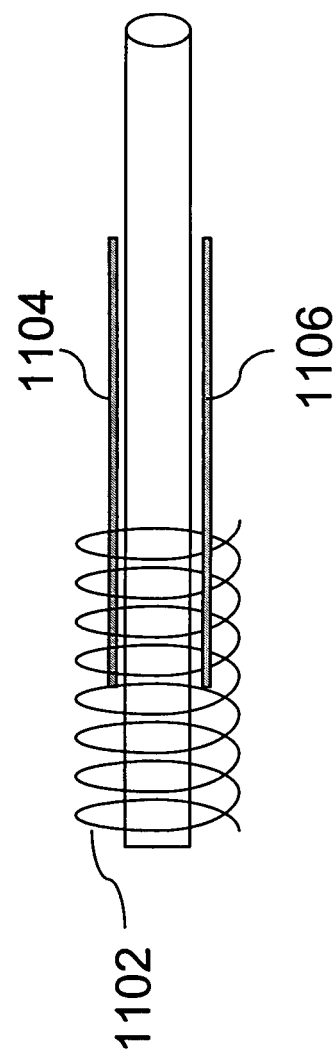

In embodiments where a capacitive device is used, the plasma within the region of the capacitive device may be modified. For example, the load coil may be configured to provide inductive coupling, which tends to be a low impedance discharge with high circulating currents and high gas temperatures, while the capacitor may be constructed and arranged to be driven at much higher RF voltages than used with the load coil and may offer much higher electron and ion excitation to ionize, for example, elements and molecules that normally do not easily ionize with the standard load coil. In certain embodiments, the capacitive plates and the load coil do not have to be within the same region. For example and referring to FIG. 10A, the load coil 1102 may be positioned in a desolvation region where much higher gas temperatures may be desired, and the capacitive plates 1104 and 1106 may be positioned after the load coil in the excitation region where higher ionization potentials and cooler gas temperatures (lower background) may be desired. In some embodiments, the capacitive plates 1104 and 1106 may extend beyond the end of the load coil 1102 (see FIG. 103B). This arrangement may provide a high gas temperature and high excitation energy within the coil and a cooler gas temperature with high excitation potential in the capacitor only region. Additional configurations for device that include both an induction device and a capacitive device will be readily selected by the person of ordinary skill in the art, given the benefit of this disclosure.

In accordance with certain examples, the exact power level provided to induction device and the capacitive device may vary. In certain examples, radio frequencies of about 10 MHz to about 2500 MHz at a power of about 500 Watts to about 2500 watts may be provided to the induction device. In certain examples, radio frequencies of about 0.1 MHz to about 2500 MHz at a power of about 500 Watts to about 2500 watts may be provided to the capacitive device.

In accordance with certain examples, the inductive device may be used to control the plasma gas temperature, whereas the capacitive device may be used to control the ionization potential. For example, the combination of an inductive device and a capacitive device may be used with a low flow plasma, a conventional flow plasma, or a low pressure plasma to increase the temperature of the plasma gas and/or to increase the ionization potential of the plasma to provide for more efficient ionization. In certain examples, the ionization potential of a plasma generated using an inductive device and a capacitive device may be increased to at least about 25 eV, more particularly at least about 40 eV, e.g., 60 eV or more.

Certain specific examples are described below to illustrate further the technology disclosed herein.

EXAMPLE 1

A low flow plasma was sustained using the hardware described in commonly assigned U.S. patent application Ser. No. 11/156,249, the entire disclosure of which is hereby incorporated herein by reference for all purposes. In particular, the manually controlled hardware setup described in Example 1 entitled "Hardware Setup" of U.S. patent application Ser. No. 11/156,249 was used to sustain a low flow plasma.

In brief, the hardware setup included a Fassel torch, a plasma sensor, an emergency off switch, a plasma excitation source and an Optima 4000 generator. The plasma excitation source was located on a plate in the center of the atomization device. The plate used was a 1.5 foot by 2 foot optical bench purchased from the Oriel Corporation (Stratford, Conn.). The plasma excitation source was mounted to a large aluminum angle bracket mounting the source above and at right angles to the plate. Slots were milled into the brackets allowing for lateral adjustment before securing to the plate. The plasma sensor was mounted in an aluminum box that could be positioned for viewing the plasma. The plasma sensor wiring was modified to shutdown the plasma source in the event that the plasma was extinguished. The emergency off switch was remotely mounted in an aluminum box that could be brought close to the operator. AC and DC power and the plasma sensor wiring were placed under the optical bench. Many safety features found in a conventional ICP-OES device were removed to allow operation of this setup, and there was no protection provided to the operator from hazardous voltages, or RF and UV radiation. This setup was operated remotely inside of a vented shielded screen room with separate torch exhaust. This open frame construction offered ease of setup between experiments.

The control electronics were configured with an external 24 V/2.4 A DC power supply made by Power One (Andover, Mass.). Ferrites were added to prevent RF radiation from interfering with the electronics and the computer. An ignition wire was extended from the original harness with high voltage wire and a plastic insulator to reach the torch and prevent arcing.

An optical plasma sensor was located above the plasma source. The optical plasma sensor had a small hole (about 4.5 mm in diameter) drilled through the aluminum box and mounting bracket to allow the light from the plasma to be incident on the optical plasma sensor. The optical plasma sensor protected the plasma source by shutting them down in the event that the plasma was accidentally extinguished. All of the generator functions including primary plasma ignition, gas flow control, power setting and monitoring were performed under manual control. For automated operation, a computer control using standard WinLab™ software, such as that commercially available on the Again, many other safety features were defeated to allow operation of this setup, and there was no protection provided to the operator from hazardous voltages, hazardous flumes, or RF and UV radiation. However, the person of ordinary skill in the art, given the benefit of this disclosure, will be able to implement suitable safety features to provide a safely operating device and operating environment.

Figure 11:
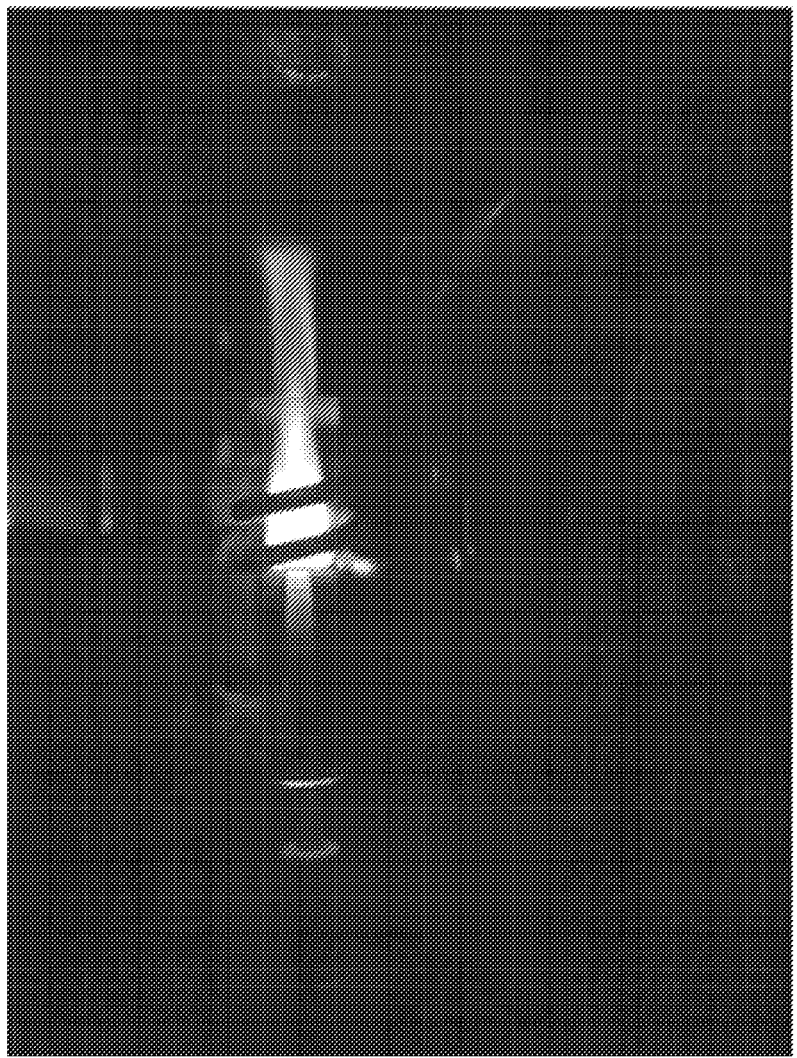
FIG. 11 is a photograph of a plasma generated using selected gas flows and a helical load coil, in accordance with certain examples.

Using the above setup along with a two turn helical load coil and a Fassel type torch, such as the load coil and Fassel type torch found in an Optima 5300V commercially available from PerkinElmer, Inc., a low flow plasma was sustained. Referring now to FIG. 11, a plasma is shown in an illustrative configuration running an yttrium sample with gas flows of 16 L/min. argon plasma gas, 0.5 L/min. auxiliary argon gas, and 0.7 L/min. argon nebulizer gas. In this mode of operation the plasma is sustained by the gas flow supplied to the plasma inlet of the torch shown in FIG. 3. Using the following procedure it was possible to generate a plasma and shift the plasma sustaining gas from the plasma inlet port 340 to the auxiliary inlet port 350 with the aid of external gas controls.

Figure 12:
FIG. 12 is a photograph of a low flow plasma generated using a nitrogen barrier gas and a helical load coil, in accordance with certain examples.

The plasma was ignited using the standard gas flows discussed herein. The argon gas entering the port 340 was increased to about 20 L/min. The auxiliary flow of argon gas entering the port 350 was increased to about 20 L/min. The gas entering the port 340 was then reduced to zero (0) L/min. The nebulizer flow was slowly increased until a desired value was reached (depending on the sample introduction system used). The plasma was sustained by a gas flow that is often used to control the height of the plasma above the injector. The result of this method was a smaller diameter plasma which could more efficiently heat the sample channel of the plasma. The smaller size of the plasma also was brighter and hotter for the same input power, as seen in FIG. 12.

EXAMPLE 2

Figure 13:
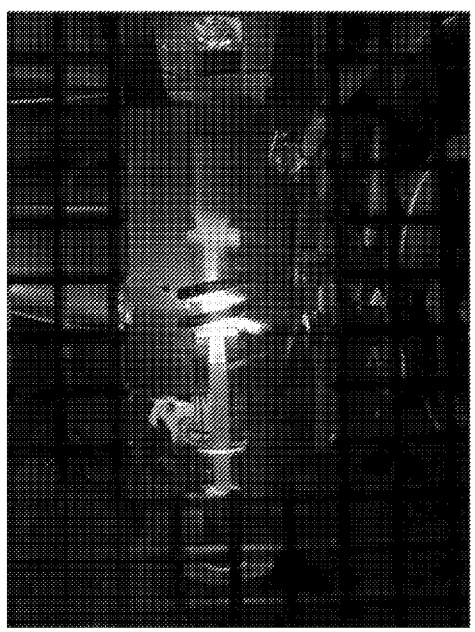
FIG. 13 is a photograph of a low flow plasma generated using a nitrogen barrier gas having a flow rate of 16 L/min. and a helical load coil, in accordance with certain examples.

An ICP generator and a Fassel type torch were used to run a plasma using a barrier gas flow. This method was accomplished with the aid of external gas controls, the hardware setup described above in Example 1, and was achieved using the following procedure. The plasma was ignited using standard gas flows. The argon gas entering the plasma inlet port 340 was increased to about 20 L/min. The argon gas entering the auxiliary port 350 was increased to about 20 L/min. The gas entering the port 340 was then reduced to zero (0) L/min. The nebulizer flow was slowly increased to a desired value (depending on the sample introduction system used). The gas supplied to the port 340 was switched to a nitrogen gas supply. The nitrogen gas flow was slowly increased from 0 L/min. to 16 L/min. The resulting plasma is shown in FIG. 13. As seen in FIG. 13, the plasma was a very small, intense, and hot discharge which was found to be very stable. The torch in this mode did not experience any melting.

Figure 14:
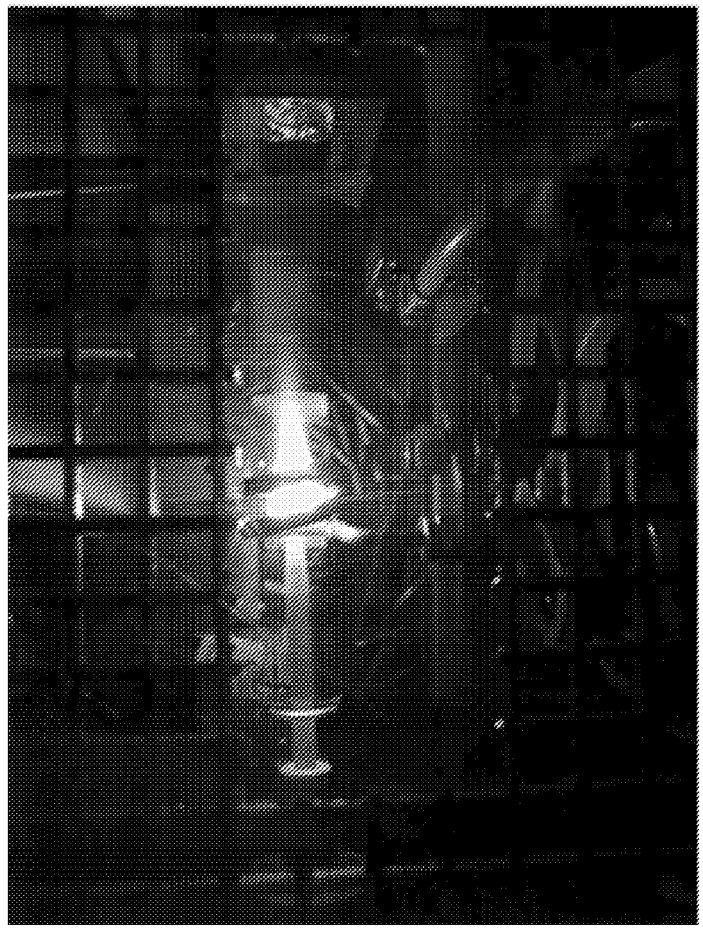
FIG. 14 is a photograph of a low flow plasma generated using a nitrogen barrier gas having a flow rate of 0.5 L/min. and a helical load coil, in accordance with certain examples.

Using this mode of operation, the shape, volume and temperature of the plasma was readily tuned or adjusted by adjusting the flow of nitrogen into the auxiliary port 350. FIG. 14 shows the same operating conditions as used to generate the plasma shown in FIG. 13 but having the nitrogen flow reduced from 16 L/min. to 0.5 L/min.

Figure 15:
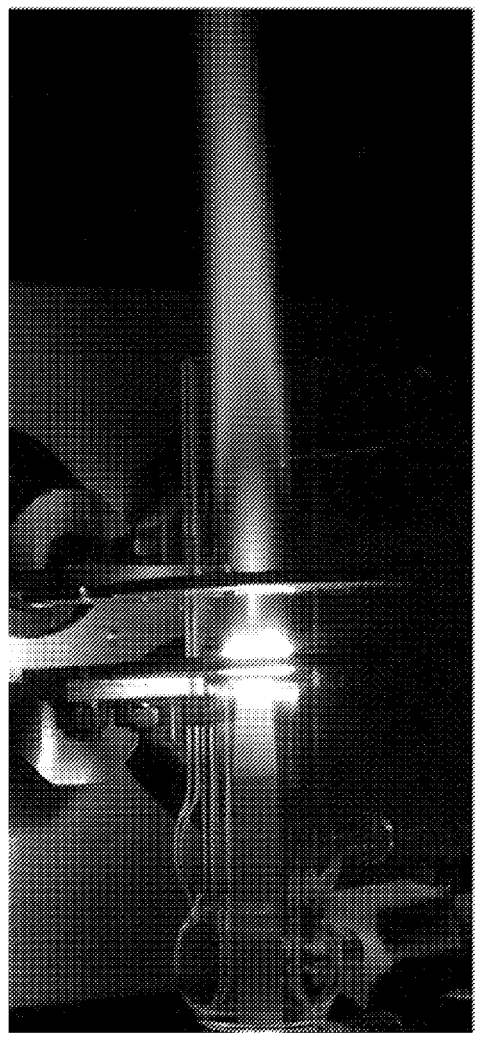
FIG. 15 is a photograph of a low flow plasma generated using a nitrogen barrier gas and flat plate induction coils, in accordance with certain examples.

FIG. 4 shows a low flow torch which uses an additional port 430 for the barrier gas. This torch was used in conjunction with an induction plate style load coil, such as those described in commonly assigned U.S. patent application Ser. No. 10/730,779 entitled "ICP-OES and ICP-MS Induction Current" and filed on Dec. 9, 2003 and commonly assigned U.S. patent application Ser. No. 11/218,912 entitled "Induction Device for Generating a Plasma" and filed on Sep. 2, 2005. The procedure that was used for igniting and running the plasma was as follows: nebulizer flow and barrier gas flows were each set to 0 L/min., the auxiliary argon gas flow was set to 0.2 L/min., and the argon plasma gas was set to 10 L/min. The plasma was ignited and the power of the induction plate load coils was set to 1500 Watts. The barrier gas flow was set to around 4 to 5 L/min. of nitrogen. The argon plasma gas was reduced to 4 L/min. The nebulizer gas was set to 0.9 L/min. of argon. A peristaltic pump in fluid communication with a nebulizer and sample of a 1000 ppm of yttrium were then initiated. The resulting plasma is shown in FIG. 15. This plasma exhibited a very stable discharge which was much smaller and hotter than a plasma generated using only argon gas flows. This smaller and hotter plasma should allow a larger volume of sample to be introduced. The background in the sample emission region of the radial view may also be greatly reduced.

Figure 16:
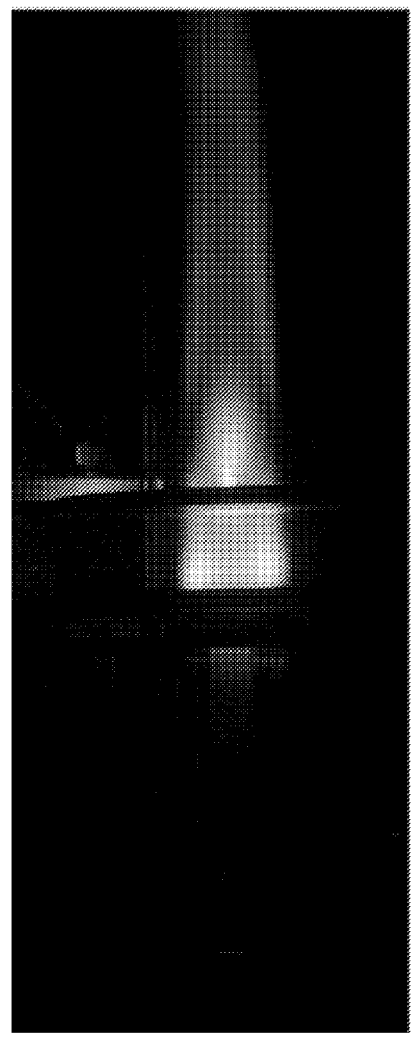
FIG. 16 is a photograph of a plasma generated using selected gas flows and flat plate induction coils, in accordance with certain examples.

For a comparative view, FIG. 16 is the same torch and induction plates used to generate the plasma of FIG. 15 except that the following gas flow rates are used: 0 L/min. of nitrogen barrier gas, 16 L/min. of argon plasma gas, 0.2 L/min. of auxiliary argon gas and 0.6 L/min. of nebulizer gas.

EXAMPLE 3

Figure 17:
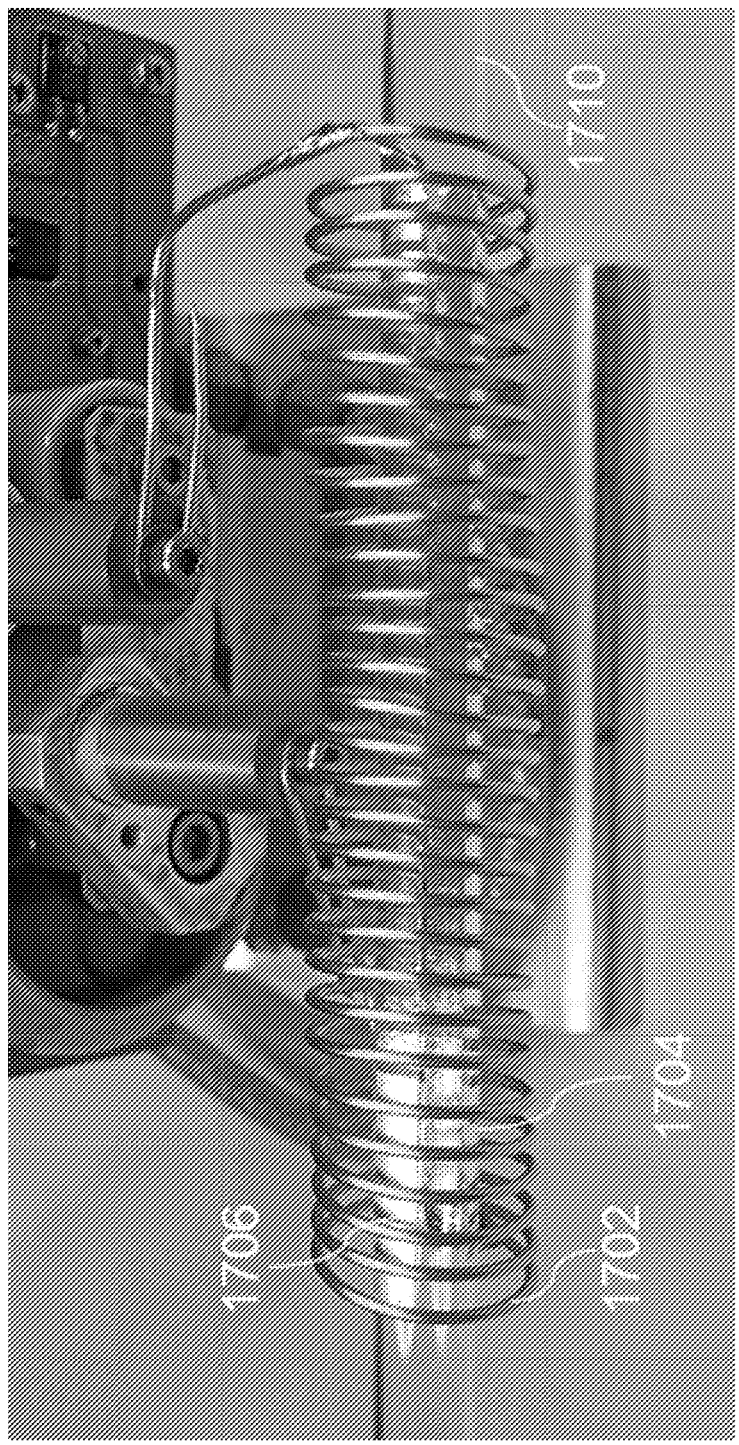
FIG. 17 is a photograph of a device used to provide a capacitively coupled plasma, in accordance with certain examples.
Figure 18:
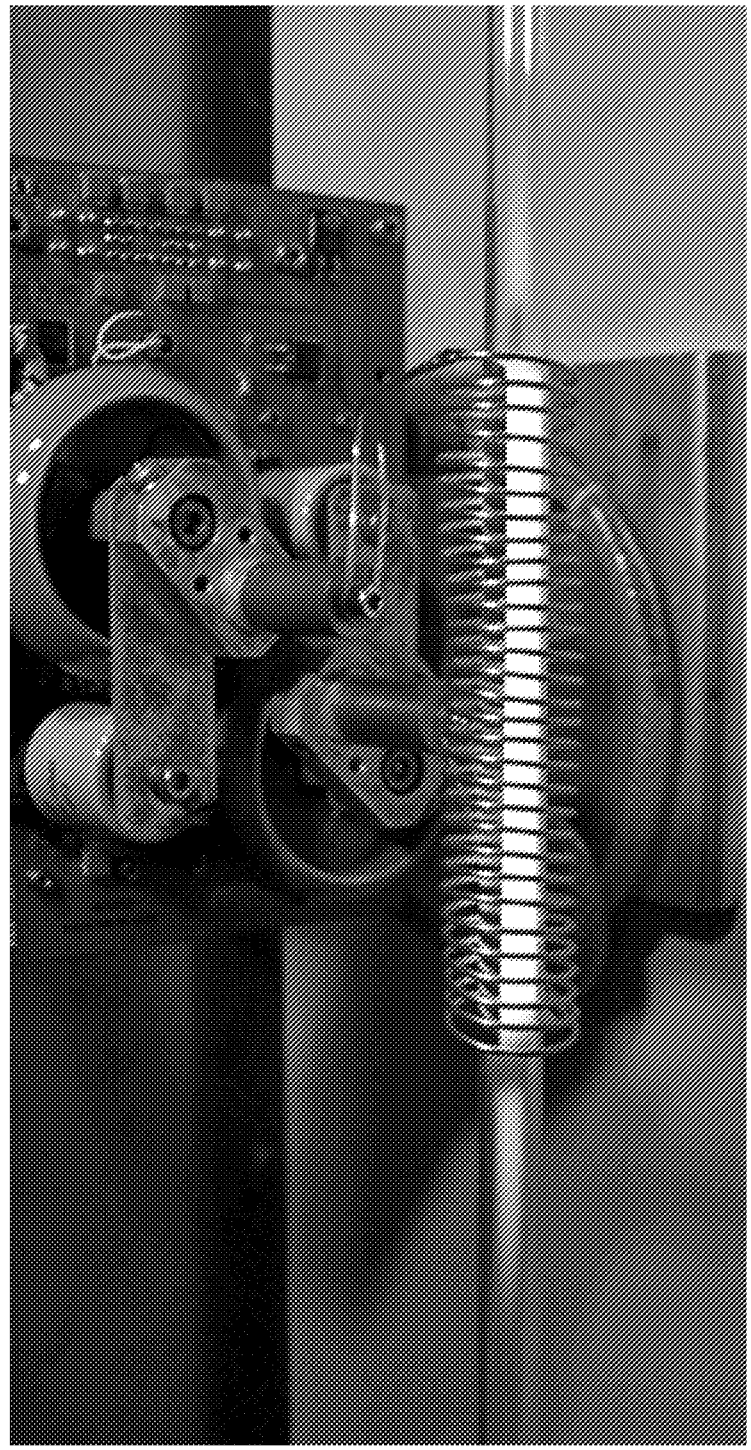
FIG. 18 is a photograph of a inductive and capacitive coupled plasma produced with the device of FIG. 17, in accordance with certain examples.
Figures 20A, 20B, 20C, 20D:
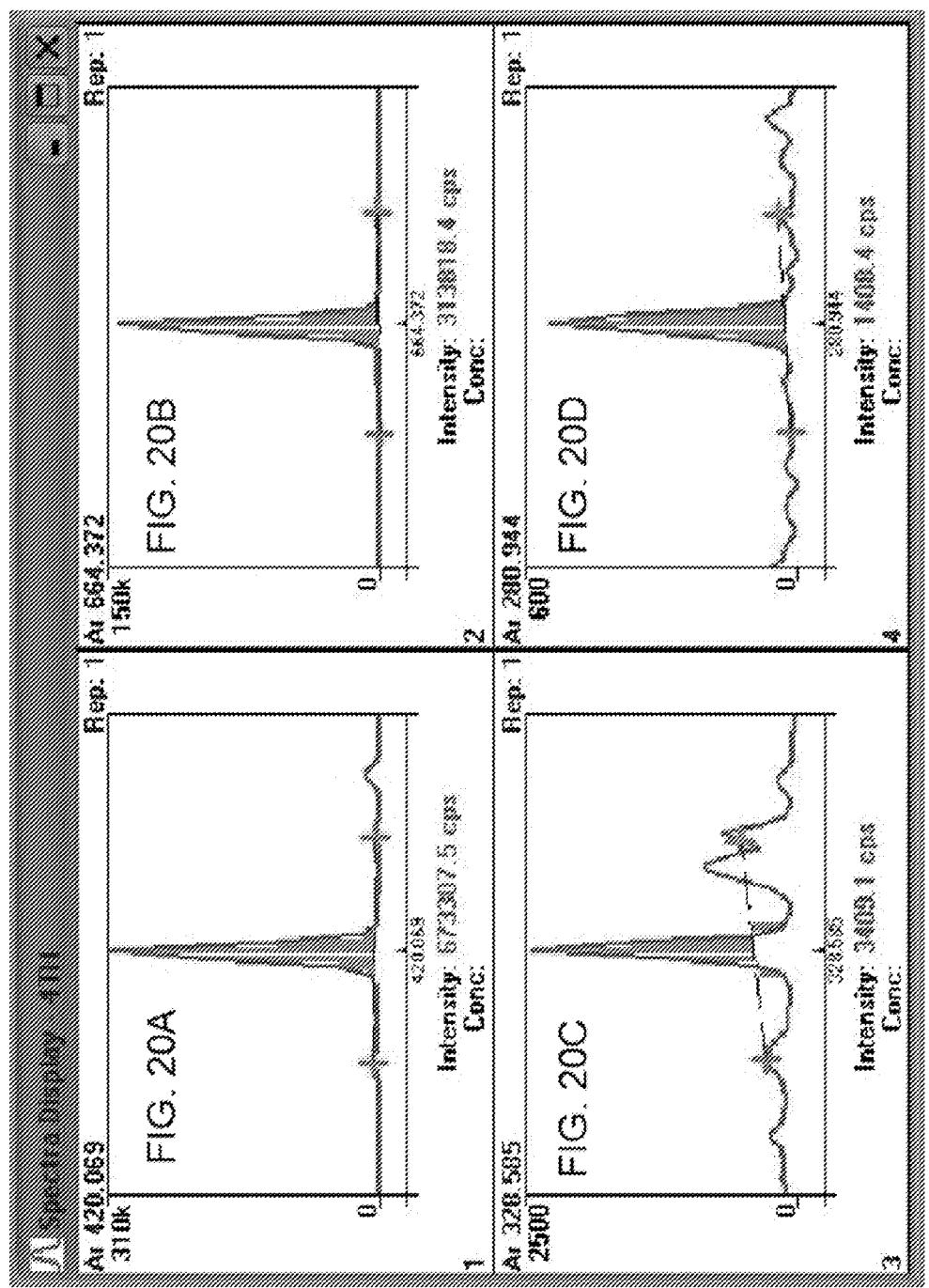
FIGS. 20A-20D are graphs showing ionization potentials using a capacitively coupled plasma, in accordance with certain examples.

An inductive and capacitive coupling device for generating a plasma was assembled using the hardware setup described in Example 1 above except that a 29.5 turn load coil 1702 was used (see FIG. 17). Copper foil tape (Model No. 1181 commercially available from 3M) was used to provide the capacitive plates 1704 and 1706. The copper foil tape that made up the capacitive plates 1704 and 2706 can be seen on the top and bottom of a quartz chamber 1710 and attached to each end of the load coil 1702 through electrical leads. The ratio of capacitive to inductive coupling was adjusted by varying the diameter of the load coil. The capacitive coupling remained constant, and the inductive coupling decreased as the diameter of the load coil increased. The operation of this device running an argon plasma at 1000 Watts and about 450 Torr may be seen in FIG. 18.

Experiments were performed to compare the performance of an inductively coupled plasma with the performance of a capacitively coupled plasma. These experiments were performed at a slightly reduced pressure of about 450 Torr. The inductively coupled plasma (see FIGS. 19A-19D) was limited to an ionization potential about equal to the first ionization potential of argon, which is 15.8 electron volts (eV). The particular embodiment using a capacitively coupled plasma provided an upper ionization potential of at least about 60 eV. FIGS. 20A-20D show the first, second, third, and fourth ionization emission peaks, respectively, of argon, with the second, third and fourth ionization emissions occurring at about 27.6 eV, 40.9 eV and 59.8 eV, respectively. The background using the capacitive coupling was also observed to be lower than the background using only inductive coupling.

When introducing elements of the examples disclosed herein, the articles "a," "an," "the" and "said" are intended to mean that there are one or more of the elements. The terms "comprising," "including" and "having" are intended to be open ended and mean that there may be additional elements other than the listed elements. It will be recognized by the person of ordinary skill in the art, given the benefit of this disclosure, that various components of the examples can be interchanged or substituted with various components in other examples. Should the meaning of the terms of any of the patents, patent applications or publications incorporated herein by reference conflict with the meaning of the terms used in this disclosure, the meaning of the terms in this disclosure are intended to be controlling.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method of generating a plasma in a torch, the method comprising:
    igniting a plasma using an argon gas flow at a first flow rate and using coupling of both inductive and capacitive coupled RF energies; and
    introducing a non-argon barrier gas flow into the torch.

2. The method of claim 1, further comprising reducing the argon gas flow in the torch from the first flow rate to a second flow rate that is less than the first flow rate.

3. The method of claim 1 further comprising selecting the non-argon barrier gas flow to be nitrogen.

4. The method of claim 1 further comprising replacing about 75% of the argon gas flow with the non-argon barrier gas flow.

5. The method of claim 1 further configuring the capacitive coupling to increase ionization potential of the plasma to at least about 25 eV.

6. The method of claim 1 further comprising configuring the torch with a first plate and a second plate to provide the capacitive coupling.

7. A method comprising providing inductive coupling and capacitive coupling to a plasma to increase the ionization potential of the plasma.

8. The method of claim 7 further comprising configuring the capacitive coupling to increase ionization potential of the plasma to at least about 25 eV.

9. The method of claim 7 further comprising configuring a torch with a first plate and a second plate to provide the capacitive coupling.

10. A method of generating a low flow plasma in a torch, the method comprising:
    igniting a plasma using an argon gas flow at a first flow rate and using coupling of both inductive and capacitive coupled RF energies;

introducing a non-argon barrier gas flow into the torch; and
reducing the first flow rate to less than or equal to five liters/minute.

11. The method of claim 10, further comprising selecting the non-argon barrier gas to be nitrogen.

12. The method of claim 10, further comprising configuring the capacitive coupling to increase ionization potential of the plasma to at least about 25 eV.

13. The method of claim 10, further comprising configuring the torch with a first plate and a second plate to provide the capacitive coupling.

14. The method of claim 13, further comprising configuring the first plate to be substantially parallel to the second plate.

15. The method of claim 10, further comprising the reducing the first flow rate to less than four liters/minute.

16. The method of claim 15, further comprising configuring the non-argon gas flow to be about four liters/minute to about five liters/minute.

17. The method of claim 10, further comprising selecting the non-argon barrier gas to be air.

18. The method of claim 10, further comprising sustaining the plasma in the torch using a loop current.

19. A method of generating a plasma comprising:
igniting a plasma in a torch using an argon gas flow at a first flow rate, in which the torch comprises an inductive device and a capacitive device, the capacitive device comprising at least one plate to provide capacitive coupling that increases ionization potential of the plasma to at least about 25 eV;
introducing a non-argon barrier gas flow into the torch; and
reducing the first flow rate to a second flow rate that is less than the first flow rate.

20. The method of claim 19, in which the inductive device comprises at least one plate electrode.

* * * * *